US008627299B2

(12) United States Patent
Frank et al.

(10) Patent No.: US 8,627,299 B2
(45) Date of Patent: Jan. 7, 2014

(54) VIRTUAL MACHINE AND PROGRAMMING LANGUAGE FOR EVENT PROCESSING

(75) Inventors: Joachim H. Frank, Greenwich, CT (US); Wilfred C. Jamison, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1225 days.

(21) Appl. No.: 12/040,485

(22) Filed: Feb. 29, 2008

(65) Prior Publication Data

US 2009/0222793 A1 Sep. 3, 2009

(51) Int. Cl.
*G06F 9/44* (2006.01)
*G06F 9/45* (2006.01)

(52) U.S. Cl.
USPC ............ 717/146; 717/104; 717/106; 717/114

(58) Field of Classification Search
None
See application file for complete search history.

(56) References Cited

U.S. PATENT DOCUMENTS

| | | | |
|---|---|---|---|
| 4,819,233 A | | 4/1989 | Delucia et al. |
| 4,875,161 A | | 10/1989 | Lahti |
| 5,481,717 A | | 1/1996 | Gaboury |
| 5,546,593 A | * | 8/1996 | Kimura et al. ............... 712/228 |
| 5,596,752 A | * | 1/1997 | Knudsen et al. ............. 717/117 |
| 5,721,920 A | * | 2/1998 | Mak et al. ..................... 718/102 |
| 5,872,974 A | | 2/1999 | Mezick |
| 5,878,262 A | | 3/1999 | Shoumura et al. |
| 5,909,684 A | * | 6/1999 | Nelson .......................... 717/118 |
| 5,926,638 A | | 7/1999 | Inoue |
| 6,131,185 A | | 10/2000 | Coskun et al. |
| 6,202,199 B1 | | 3/2001 | Wygodny et al. |
| 6,230,309 B1 | | 5/2001 | Turner et al. |
| 6,275,976 B1 | | 8/2001 | Scandura |
| 6,282,701 B1 | | 8/2001 | Wygodny et al. |
| 6,292,938 B1 | | 9/2001 | Sarkar et al. |
| 6,330,710 B1 | * | 12/2001 | O'Neil et al. ................. 717/100 |
| 6,385,765 B1 | | 5/2002 | Cleaveland et al. |
| 6,412,106 B1 | | 6/2002 | Leask et al. |
| 6,473,794 B1 | | 10/2002 | Guheen et al. |
| 6,636,863 B1 | * | 10/2003 | Friesen ................................ 1/1 |
| 6,658,649 B1 | | 12/2003 | Bates et al. |
| 6,668,370 B1 | | 12/2003 | Harmon et al. |
| 6,671,875 B1 | | 12/2003 | Lindsey et al. |

(Continued)

FOREIGN PATENT DOCUMENTS

CN    101213518 A    7/2008

OTHER PUBLICATIONS

David Flanagan, Java in a Nutshell A Desktop Quick Reference, $2^{nd}$ Edition, published by O'Reilly 1997, ISBN—1-56592-262-x, pp. 127-157, 227-233.*

(Continued)

*Primary Examiner* — Tuan Q. Dam
*Assistant Examiner* — Zheng Wei
(74) *Attorney, Agent, or Firm* — Marcia L. Doubet

(57) ABSTRACT

A virtual machine supports execution of compiler-generated code and provides an execution environment for code that may correspond to any of several different event-driven or message-driven programming models (such as state machines, rules for complex event processing and event correlation, monitoring contexts, processes, and mediations). The programming models may be used in business monitoring and/or business integration environments. A programming language is defined for execution using the virtual machine, which contains a relatively small number of instructions and which is preferably generated by a compiler from a higher-level, event-driven or message-driven model.

21 Claims, 24 Drawing Sheets

(56) References Cited

U.S. PATENT DOCUMENTS

| | | | |
|---|---|---|---|
| 6,779,120 B1 | 8/2004 | Valente et al. | |
| 6,807,559 B1* | 10/2004 | Budhiraja | 709/203 |
| 6,868,525 B1 | 3/2005 | Szabo | |
| 7,058,928 B2 | 6/2006 | Wygodny et al. | |
| 7,089,534 B2 | 8/2006 | Hartman et al. | |
| 7,216,338 B2 | 5/2007 | Barnett et al. | |
| 7,219,329 B2* | 5/2007 | Meijer et al. | 717/106 |
| 7,240,101 B2* | 7/2007 | Rich et al. | 709/219 |
| 7,275,237 B1 | 9/2007 | Schneider et al. | |
| 7,340,728 B2 | 3/2008 | Kutter et al. | |
| 7,356,735 B2* | 4/2008 | Bennett et al. | 714/34 |
| 7,401,322 B1 | 7/2008 | Shagam et al. | |
| 7,418,584 B1* | 8/2008 | Klaiber et al. | 712/229 |
| 7,437,613 B2 | 10/2008 | Baumberger | |
| 7,441,235 B2 | 10/2008 | Tohdo et al. | |
| 7,464,373 B1 | 12/2008 | Yunt et al. | |
| 7,472,381 B2* | 12/2008 | Fox et al. | 717/148 |
| 7,493,606 B2 | 2/2009 | Morin | |
| 7,640,538 B2 | 12/2009 | Bennett et al. | |
| 7,647,528 B2 | 1/2010 | Yilmaz et al. | |
| 7,685,607 B2* | 3/2010 | Frank et al. | 719/318 |
| 7,685,635 B2* | 3/2010 | Vega et al. | 726/17 |
| 7,703,084 B2 | 4/2010 | Lindhorst et al. | |
| 7,716,676 B2* | 5/2010 | Sawicki et al. | 719/313 |
| 7,788,649 B1* | 8/2010 | Kunisetty et al. | 717/137 |
| 7,861,232 B2* | 12/2010 | Ebie et al. | 717/131 |
| 7,870,498 B2* | 1/2011 | Drummond et al. | 715/763 |
| 7,886,293 B2* | 2/2011 | Anderson et al. | 718/1 |
| 7,900,137 B2* | 3/2011 | Ivarsoy et al. | 715/238 |
| 7,904,889 B2 | 3/2011 | Avitzur et al. | |
| 7,904,903 B2 | 3/2011 | Grobman et al. | |
| 7,970,892 B2 | 6/2011 | Seduhkin et al. | |
| 7,971,040 B2* | 6/2011 | Ayrignac et al. | 712/228 |
| 8,006,233 B2 | 8/2011 | Centonze et al. | |
| 8,020,153 B2 | 9/2011 | Aoshima et al. | |
| 8,095,650 B1* | 1/2012 | Cheng et al. | 709/224 |
| 8,112,765 B2 | 2/2012 | Newport et al. | |
| 8,266,586 B2 | 9/2012 | Wang | |
| 8,290,980 B2* | 10/2012 | Baio et al. | 707/783 |
| 8,312,202 B1 | 11/2012 | Koryakin et al. | |
| 8,365,149 B2 | 1/2013 | Frank et al. | |
| 8,397,216 B2 | 3/2013 | Frank et al. | |
| 2002/0087950 A1 | 7/2002 | Brodeur et al. | |
| 2002/0111965 A1 | 8/2002 | Kutter | |
| 2002/0138821 A1 | 9/2002 | Furman et al. | |
| 2003/0149823 A1* | 8/2003 | Newman et al. | 710/305 |
| 2003/0159132 A1 | 8/2003 | Barnett et al. | |
| 2003/0176998 A1 | 9/2003 | Walker | |
| 2003/0182626 A1 | 9/2003 | Davidov et al. | |
| 2003/0182651 A1* | 9/2003 | Secrist et al. | 717/120 |
| 2003/0208351 A1 | 11/2003 | Hartman et al. | |
| 2003/0208743 A1 | 11/2003 | Chong et al. | |
| 2004/0060038 A1 | 3/2004 | Johnston-Watt et al. | |
| 2004/0181781 A1 | 9/2004 | Tohdo et al. | |
| 2005/0021348 A1 | 1/2005 | Chan et al. | |
| 2005/0091093 A1 | 4/2005 | Bhaskaran et al. | |
| 2005/0138605 A1 | 6/2005 | Yamamoto | |
| 2005/0155019 A1* | 7/2005 | Levine et al. | 717/127 |
| 2005/0166182 A1 | 7/2005 | Wang et al. | |
| 2005/0216888 A1* | 9/2005 | Drummond et al. | 717/113 |
| 2005/0235264 A1 | 10/2005 | Hines | |
| 2005/0257243 A1* | 11/2005 | Baker | 726/1 |
| 2006/0031814 A1 | 2/2006 | Morin | |
| 2006/0123396 A1 | 6/2006 | Fox et al. | |
| 2006/0130029 A1 | 6/2006 | Morishita et al. | |
| 2006/0149582 A1 | 7/2006 | Hawkins | |
| 2006/0241954 A1 | 10/2006 | Jeng et al. | |
| 2006/0242627 A1 | 10/2006 | Wygodny et al. | |
| 2006/0253842 A1 | 11/2006 | Pees et al. | |
| 2007/0006228 A1* | 1/2007 | Grobman et al. | 718/1 |
| 2007/0179823 A1 | 8/2007 | Bhaskaran et al. | |
| 2007/0220493 A1 | 9/2007 | Morizawa | |
| 2007/0240125 A1 | 10/2007 | Degenhardt et al. | |
| 2008/0010597 A1 | 1/2008 | Seeman et al. | |
| 2008/0034351 A1 | 2/2008 | Pugh et al. | |
| 2008/0046872 A1* | 2/2008 | Cooper | 717/140 |
| 2008/0065740 A1* | 3/2008 | Baio et al. | 709/217 |
| 2008/0127100 A1* | 5/2008 | O'Farrell et al. | 717/125 |
| 2008/0184203 A1 | 7/2008 | Yan | |
| 2009/0006063 A1 | 1/2009 | Sedukhin et al. | |
| 2009/0055838 A1 | 2/2009 | Sedukhin et al. | |
| 2009/0077564 A1* | 3/2009 | Loeser | 718/108 |
| 2009/0119493 A1* | 5/2009 | Venkitachalam et al. | 712/238 |
| 2009/0144711 A1* | 6/2009 | Chang | 717/151 |
| 2009/0217235 A1 | 8/2009 | Suenbuel | |
| 2009/0222789 A1 | 9/2009 | Frank et al. | |
| 2009/0222795 A1 | 9/2009 | Frank et al. | |
| 2009/0254923 A1 | 10/2009 | Newport et al. | |
| 2009/0300578 A1* | 12/2009 | Neil | 717/104 |
| 2010/0211828 A1* | 8/2010 | Moyer et al. | 714/45 |
| 2010/0332968 A1 | 12/2010 | Squillace | |
| 2011/0179151 A1 | 7/2011 | Sedukhin et al. | |
| 2012/0151484 A1 | 6/2012 | Frank et al. | |

OTHER PUBLICATIONS

Klein et al., A Machine-Checked Model for a Java-Like Language, Virtual Machine, and Compiler, published by ACM Transactions on Programming Languages and Systems, vol. 28, No. 4, Jul. 2006, pp. 619-695.*

Zeng et al., Model analysis for business event processing, published by IBM System Journal, vol. 46, No. 4, 2007, pp. 817-831.*

Adi, Asaf et al., "Amit—The Situation Manager", The VLDB Journal—The International Journal on Very Large Data Bases, vol. 13, Issue 2 (May 2004), pp. 177-203.

Adi, Asaf et al., "The Situation Manager Rule Language", presented at RuleML, 2002.

Frank, Jim H., "Jump-start business activity monitoring (BAM), Part 1: Introduction to monitor modeling", http://www-128.ibm.com/developerworks/architecture/library/ar-bam1/, Feb. 27, 2007.RANK.

Adams, Greg et al., "IBM WebSphere Developer Technical Journal: A guided tour of WebSphere Integration Developer—Part 1", http://www.ibm.com/developerworks/websphere/techjournal/0602_gregory/0602_gregory.html, Feb. 22, 2006.

Joachim H. Frank et al., U.S. Appl. No. 12/040,461, filed Feb. 29, 2008, Office Action, Jul. 7, 2011, 18 pages.

Joachim H. Frank et al., U.S. Appl. No. 12/040,461, filed Feb. 29, 2008, Office Action Appendices, Jul. 7, 2011, 5 pages.

Haase, Kim, "Java(TM) Message Service API Tutorial", Sun Microsystems, Inc., Aug. 2001, XP00226306.

PCT International Search Report and Written Opinion for application PCT/EP2009/052285, mailed Jun. 2, 2009, 8 pages.

Joachim H. Frank, et al., U.S. Appl. No. 12/040,461, filed Feb. 29, 2008, Office Action, May 18, 2012, 16 pages.

Yang et al., "Clairvoyant: A Comprehensive Source-Level Debugger for Wireless Sensor Networks", published 2007 by ACM, pp. 189-204.

Bernard Pope, "Declarative Debugging with Buddha", published in 2005 by Springer-Verlag Berlin Heidelberg, pp. 273-308.

Pothier et al., "Scalable Omniscient Debugging", published in 2007 by ACM, pp. 535-551.

Bai, Lan S., et al., "Archetype-Based Design: Sensor Network Programming for Application Experts, Not Just Programming Experts", ACM, Proceedings of IPSN'09, Apr. 13-16, 2009, San Francisco, CA. pp. 85-96.

Bhatotia, Pramod, et al., "Incoop: MapReduce for Incremental Computations", ACM, SOCC'11, Oct. 27-28, 2011, Cascais, Portugal. 14 pages.

Gasiunas, Vaidas, et al., "EScala: Modular Event-Driven Object Interactions in Scala", ACM, Proceedings of AOSD'11, Mar. 21-25, 2011, Pernambuco, Brazil. pp. 227-240.

Marth, Kevin, "Programming in the MPL-RM Programming Language", Proceedings of 43rd ACM Southeast Conference, Mar. 18-20, 2005, Kennesaw, GA. pp. 2-262-2-268.

(56) References Cited

OTHER PUBLICATIONS

Batory, Don, "Program Refactoring, Program Synthesis, and Model-Driven Development", Proceedings of the 16th International Conference on Compiler Constuction (CC'07), 2007, vol. 4420 of LNCS, pp. 156-171.
Hohpe, Gregor, "Developing Software in a Service-Oriented World", published by ThoughtWorks, Inc., 2005. 11 pages.
Joachim H. Frank, et al., Office Action from Chinese Patent Office, Oct. 26, 2012. 5 pages, not translated.
Joachim H. Frank, et al., U.S. Appl. No. 12/040,508, filed Feb. 29, 2008, Office Action, Feb. 23, 2012, 14 pages.
Joachim H. Frank, et al., U.S. Appl. No. 12/040,461, filed Feb. 29, 2008, Office Action, Jan. 25, 2012, 26 pages.
Kumar Bhaskaran, et al., U.S. Appl. No. 11/343,145, filed Jan. 30, 2006, Office Action, Jan. 17, 2008, 15 pages.
Kumar Bhaskaran, et al., U.S. Appl. No. 11/343,145, filed Jan. 30, 2006, Office Action, Apr. 27, 2009, 16 pages.
Kumar Bhaskaran, et al., U.S. Appl. No. 11/343,145, filed Jan. 30, 2006, Office Action, Jul. 22, 2009, 20 pages.
Kumar Bhaskaran, et al., U.S. Appl. No. 11/343,145, filed Jan. 30, 2006, Office Action, Apr. 28, 2010, 21 pages.
Kumar Bhaskaran, et al., U.S. Appl. No. 11/343,145, filed Jan. 30, 2006, Office Action, Dec. 7, 2010, 24 pages.
Joachim H. Frank, et al., U.S. Appl. No. 13/403,744, filed Feb. 23, 2012, Office Action, Mar. 5, 2013, 18 pages.
Joachim H. Frank, et al., Office Action from Chinese Patent Office for related case RSW920070282CN1, May 13, 2013, 8 pages, not translated.

* cited by examiner

FIG. 9

```
<xs:schema xmlns:xs="http://www.w3.org/2001/XMLSchema"
targetNamespace="http://www.example.org/surveillance"
xmlns:tns="http://www.example.org/surveillance"
elementFormDefault="qualified" >                          910

<xs:element name="open_door" type="tns:DoorEvent" />
<xs:element name="close_door" type="tns:DoorEvent" />     920

<xs:complexType name="DoorEvent">
931   <xs:attribute name="id" type="xs:string" />
932   <xs:attribute name="time" type="xs:dateTime" />
      </xs:complexType>

</xs:schema>
```
900

FIG. 10

```
<tns:open_door
  xmlns:tns="http://www.example.org/surveillance"
1010 id="Door001"
1020 time="2008-01-01T09:33:41+05:00"/>
```
1000

FIG. 11

```
<xs:schema xmlns:xs="http://www.w3.org/2001/XMLSchema"
  targetNamespace="http://www.example.org/surveillance"
  xmlns:tns="http://www.example.org/surveillance"
  elementFormDefault="qualified" >                          ~1111
1110  <xs:include schemaLocation="doorEvent.xsd" />
                                          ~1122
1120  <xs:element name="stateMachine" type="tns:StateMachine" />
1130  <xs:complexType name="StateMachine">
         <xs:sequence>
           <!-- "system" -->
1131       <xs:element name="_ice_key" type="xs:string" />
           <!-- "metrics" -->
1132       <xs:element name="id" type="xs:string" />
1133       <xs:element name="state" type="tns:DoorState" />
1134       <xs:element name="lastEvent" type="xs:dateTime" />
           <!-- "events" -->
1135       <xs:element ref="tns:open_door" minOccurs="0" />
1136       <xs:element ref="tns:close_door" minOccurs="0" />
         </xs:sequence>
      </xs:complexType>

1140  <xs:simpleType name="DoorState">
         <xs:restriction base="xs:string">
1141       <xs:enumeration value="Opened" />
1142       <xs:enumeration value="Closed" />
         </xs:restriction>
      </xs:simpleType>

</xs:schema>
```

```
<tns:stateMachine
    xmlns:tns="http://www.example.org/surveillance" >
1210    <tns:_ice_key>8f5d52b4-9243-427c-b4e5-00829aa335d7</tns:_ice_key>
1220    <tns:id>Door001</tns:id>
1230    <tns:state>Opened</tns:state>
1240    <tns:lastEvent>2008-01-01T09:33:41+05:00</tns:lastEvent>
1250    <tns:open_door id="Door001" time="2008-01-01T09:33:41+05:00"></tns:open_door>
1260    <tns:close_door id="Door001" time="2008-01-01T08:20:19+05:00"></tns:close_door>
</tns:stateMachine>
```

```
<ice:ice id="DoorStateMachine" version="1.0"
    targetNamespace="http://www.example.org/surveillance"
    xmlns:tns="http://www.example.org/surveillance"
    xmlns:ice="http://www.ibm.com/xmlns/prod/websphere/monitoring/6.1.0/ice"
    xmlns:fn="http://www.w3.org/2005/xpath-functions">
```

*1310* `<ice:onEvent` *1313* *1314*
   *1312* `rootElement="tns:open_door" filter="fn:exists(./@id)">`

*1320* {
   `<ice:fanOut` *1323* *1324*
   *1325* `targetRootElement="tns:stateMachine" correlationPredicate="./@id = tns:id"`
   *1327* `noMatches="createNewTarget" oneMatch="deliverToTarget"` *1326*
   `multipleMatches="signalError" >` *1331* *1332*

*1330*   `<ice:branch condition="fn:exists(tns:_ice_key)" distance="3"/>`
*1340*   `<ice:assign target="tns:_ice_key" value="ice:newKey()"/>`
*1350*   `<ice:assign target="tns:id" value="./@id"/>`
*1360*   `<ice:assign target="tns:open_door" value="." />`
*1370*   `<ice:assign target="tns:lastEvent" value="./@time" />`
*1380*   `<ice:assign target="tns:state" value="Opened" />`
   `</ice:fanOut>`
`</ice:onEvent>`

*1390* `<ice:onEvent` *1392* *1393*
  *1391* `rootElement="tns:close_door" filter="fn:exists(./@id)">`
   `<ice:fanOut`
     `targetRootElement="tns:stateMachine" correlationPredicate="./@id = tns:id"`
     `noMatches="createNewTarget" oneMatch="deliverToTarget"`
     `multipleMatches="treatAsError" >`
   `<ice:branch condition="fn:exists(tns:_ice_key)" distance="3"/>`
   `<ice:assign target="tns:_ice_key" value="ice:newKey()"/>`
   `<ice:assign target="tns:id" value="./@id"/>`
   `<ice:assign target="tns:close_door" value="." />`
   `<ice:assign target="tns:lastEvent" value="./@time" />`
*1394* `<ice:assign target="tns:state" value="Closed" />`
   `</ice:fanOut>` *1395* *1396*
`</ice:onEvent>`

`</ice:ice>`

```
<mm:monitor xmlns:cbe="http://www.ibm.com/AC/commonbaseevent1_0_1"
        xmlns:fn="http://www.w3.org/2005/xpath-functions"
        xmlns:mm="http://www.ibm.com/xmlns/prod/websphere/monitoring/6.1.0/mm"
        xmlns:xs="http://www.w3.org/2001/XMLSchema"
        xmlns:xsd="http://www.w3.org/2001/XMLSchema-datatypes"
    displayName.="AggregateCost" id="AggregateCost"
    timestamp="2007-09-26T23:30:06Z"
    targetNamespace="http://www.example.org/cost/aggregator">
    <monitorDetailsModel displayName="CostAggregatorModel" id="MDM">
      <monitoringContext displayName="CostAggregator" id="CostAggregator">
1410   <inboundEvent displayName="costReport" id="costReport"
             multipleCorrelationMatches="raiseException"
1412 ─┤      noCorrelationMatches="createNewContext"
             oneCorrelationMatch="deliverEvent"
             rootElement="cbe:CommonBaseEvent"
             extensionName="ReportItemCost">
1414    <correlationPredicate expression="costReport/extendedData/orderNumber = orderNum" />
1419    </inboundEvent>
         <metric displayName="orderNum" id="orderNum" type="xsd:string" isPartOfKey="true">
            <map> 1421
               <outputValue>
1420 ─           <singleValue expression="costReport/extendedData/orderNumber" />
               </outputValue>
            </map>
         </metric>
         <metric displayName="shippingCost" id="shippingCost" type="xsd:decimal">
            <defaultValue>
1430 ─         <singleValue expression="29.75"/>
            </defaultValue>
         </metric>
```

FIG. 14
(cont'd)

```
<metric displayName="totalCost" id="totalCost" type="xsd:decimal">
    <map> 1441
        <outputValue>
            <singleValue expression="if (fn:exists(itemCost)) then itemCost + shippingCost else
                shippingCost"/>
        </outputValue>
    </map>
</metric>
```
(1440)

```
<metric displayName="itemCost" id="itemCost" type="xsd:decimal">
    <map>
        <outputValue>
            <singleValue expression="itemCost +xs:decimal(costReport/extendedData/cost)" />
        </outputValue>
    </map>
    <defaultValue>
        <singleValue expression="0.0"/>.
    </defaultValue>
</metric>
```
(1450)

```
            </monitoringContext>
        </monitorDetailsModel>
        <dimensionalModel displayName="CostAggregatorModel DMM" id="DMM">
            <cube displayName="CostAggregator MC Cube" id="CostAggregator_Cube"
                monitoringContext="CostAggregator" />
        </dimensionalModel>
        <eventModel id="EM">
            <import namespace="http://www.ibm.com/AC/commonbaseevent1_0_1"/>
            <import location="ReportItemCost.cbe" />
        </eventModel>
    </mm:monitor>
```

```
<ice:ice xmlns="http://www.example.org/cost/aggregator"
    xmlns:cbe="http://www.ibm.com/AC/commonbaseevent1_0_1"
    xmlns:fn="http://www.w3.org/2005/xpath-functions"
    xmlns:ice="http://www.ibm.com/xmlns/prod/websphere/monitoring/6.1.0/ice"
    xmlns:mm="http://www.ibm.com/xmlns/prod/websphere/monitoring/6.1.0/mm"
    xmlns:xs="http://www.w3.org/2001/XMLSchema"
    xmlns:xsd="http://www.w3.org/2001/XMLSchema-datatypes"
    id="AggregateCost_ice" targetNamespace="http://www.example.org/cost/aggregator">
  <ice:onEvent filter="cbe:CommonBaseEvent/@extensionName='ReportItemCost'"
```
1510 `rootElement="cbe:CommonBaseEvent">`

1512 — 1511 `<ice:fanOut correlationPredicate=`
`"cbe:CommonBaseEvents/cbe:CommonBaseEvent[1]/cbe:extendedDataElements`
`[@name='orderNumber'][1]/cbe:values[1]/text() = orderNum"` 1514
`multipleMatches="signalError" noMatches="createNewTarget"`
`oneMatch="deliverToTarget" targetRootElement="AggregateCost.MDM.CostAggregator">`

1520 `<ice:branch condition="fn:exists(_ice_key)" distance="5"/>`
1530 `<ice:assign target="_ice_key" value="ice:newKey()"/>`
1540 `<ice:assign target="shippingCost" value="29.75"/>`
1550 `<ice:assign target="itemCost" value="0.0"/>`.
1560 `<ice:assign target="totalCost" value="if (fn:exists(itemCost)) then`
`itemCost + shippingCost else shippingCost"/>`
1570 `<ice:assign target="orderNum" value=`
`"cbe:CommonBaseEvents/cbe:CommonBaseEvent[1]/cbe:extendedDataElements`
`[@name='orderNumber'][1]/cbe:values[1]/text()"/>`
1580 `<ice:assign target="itemCost" value="itemCost + xs:decimal`
`(cbe:CommonBaseEvents/cbe:CommonBaseEvent[1]/cbe:extendedDataElements`
`[@name='cost'][1]/cbe:values[1]/text())"/>`
1590 `<ice:assign target="totalCost" value="if (fn:exists(itemCost)) then`
`itemCost + shippingCost else shippingCost"/>`
`</ice:fanOut>`
`</ice:onEvent>`
`</ice:ice>`

```
<m2i:m2i xmlns:m2i=
"http://www.ibm.com/xmlns/prod/websphere/monitoring/6.1.0/m2i"
        iceResource="platform:/resource/HelloIce/AggregateCost.ice" 1610
        mmResource="platform:/resource/HelloIce/AggregateCost.mm"> 1611
1620  <m2i:mmStep iceRefs="AggregateCost.ice#//@ice/@onEvent.0   1621
        AggregateCost.ice#//@ice/@onEvent.0/@fanOut.0
        AggregateCost.ice#//@ice/@onEvent.0/@fanOut.0/@branch.0
        AggregateCost.ice#//@ice/@onEvent.0/@fanOut.0/@assign.0
1622    AggregateCost.ice#//@ice/@onEvent.0/@fanOut.0/@assign.1
        AggregateCost.ice#//@ice/@onEvent.0/@fanOut.0/@assign.2
        AggregateCost.ice#//@ice/@onEvent.0/@fanOut.0/@assign.3" mmRef= 1630
        "AggregateCost.mm#//AggregateCost/MDM/CostAggregator/costReport">
        <m2i:mmStep iceRefs=
        "AggregateCost.ice#//@ice/@onEvent.0/@fanOut.0/@assign.4" mmRef= 1640
        "AggregateCost.mm#//AggregateCost/MDM/CostAggregator/orderNum/@map.0"/>
        <m2i:mmStep iceRefs=
        "AggregateCost.ice#//@ice/@onEvent.0/@fanOut.0/@assign.5" mmRef=
        "AggregateCost.mm#//AggregateCost/MDM/CostAggregator/itemCost/@map.0"/>
1650   <m2i:mmStep iceRefs=
        "AggregateCost.ice#//@ice/@onEvent.0/@fanOut.0/@assign.6" mmRef=
        "AggregateCost.mm#//AggregateCost/MDM/CostAggregator/totalCost/@map.0"./>
        </m2i:mmStep>
</m2i:m2i>
```

```xml
<?xml version="1.0" encoding="UTF-8"?>
<xs:schema xmlns:xs="http://www.w3.org/2001/XMLSchema"
  xmlns:xsd="http://www.w3.org/2001/XMLSchema-datatypes"
  xmlns:cbe="http://www.ibm.com/AC/commonbaseevent1_0_1"
  targetNamespace.="http://www.example.org/cost/aggregator"
  xmlns:="http://www.example.org/cost/aggregator" >

<xs:import namespace="http://www.ibm.com/AC/commonbaseevent1_0_1"
            schemaLocation="CommonBaseEvent.xsd" />

<xs:element name="AggregateCost.MDM.CostAggregator">
    <xs:complexType.>
      <xs:sequence>
        <!-- "system" -->
        <xs:element name="_ice_key" type="xsd:string" />
        <!-- "metrics" -->
        <xs:element name="orderNum" type="xsd:string" />
        <xs:element name="shippingCost" type="xsd:decimal" />
        <xs:element name="totalCost" type="xsd:decimal" />
        <xs:element name="itemCost" type="xsd:decimal" />
        <!-- "events" -->
        <xs:element name="costReport"
                    type="cbe:CommonBaseEventType" />
      </xs:sequence>
    </xs:complexType>
  </xs:element>

</xs:schema>
```

```xml
<!-- Copyright 2008 International Business Machines Corporation -->
<?xml version="1.0" encoding="UTF-8"?>
<xs:schema xmlns:xs="http://www.w3.org/2001/XMLSchema"
    targetNamespace="http://www.ibm.com/xmlns/prod/websphere/monitoring/6.1.0/ice"
    xmlns:ice="http://www.ibm.com/xmlns/prod/websphere/monitoring/6.1.0/ice"
    xmlns:ecore="http://www.eclipse.org/emf/2002/Ecore"
    elementFormDefault="qualified"
    ecore:package="com.ibm.wbimonitor.xml.ice"
    ecore:nsPrefix="ice">

<xs:element name="ice" type="ice:Ice" />

<xs:complexType name="Ice">
        <xs:choice minOccurs="0" maxOccurs="unbounded">
            <xs:element name="onEvent" type="ice:OnEvent" />
            <xs:element name="macro" type="ice:Macro" />
        </xs:choice>
        <xs:attribute name="id" type="xs:NCName" use="required" />
        <xs:attribute name="version" type="xs:string" use="required" />
        <xs:attribute name="targetNamespace" type="xs:anyURI" use="required" />
    </xs:complexType>

<xs:group name="Statements">
        <xs:choice>
            <xs:element name="assign" type="ice:Assign" />
            <xs:element name="branch" type="ice:Branch" />
            <xs:element name="emit" type="ice:Emit" />
            <xs:element name="fanOut" type="ice:FanOut" />
            <xs:element name="terminate" type="ice:Terminate" />
        </xs:choice>
    </xs:group>

<xs:complexType name="OnEvent">
        <xs:sequence minOccurs="0" maxOccurs="unbounded">
            <xs:group ref="ice:Statements" />
            <!-- <terminate> is forbidden as a direct child -->
        </xs:sequence>
        <xs:attribute name="rootElement" type="xs:QName" use="optional" />
        <xs:attribute name="filter" type="xs:string" use="optional" />
    </xs:complexType>
```

FIG. 19
(cont'd)

```xml
<xs:complexType name="Macro">
    <xs:sequence minOccurs="0" maxOccurs="unbounded">
        <xs:group ref="ice:Statements" />
    </xs:sequence>
    <xs:attribute name="id" type="xs:NCName" />
</xs:complexType>

<xs:complexType name="Assign">
    <xs:attribute name="target" type="xs:string" use="required" />
    <xs:attribute name="value" type="xs:string" use="required" />
</xs:complexType>

<xs:complexType name="Branch">
    <xs:attribute name="condition" type="xs:string" use="optional" />
    <xs:attribute name="distance" type="xs:integer" use="optional" />
    <xs:attribute name="macro" type="xs:QName" use="optional" />
</xs:complexType>

<xs:complexType name="Emit">
    <xs:attribute name="event" type="xs:string" use="required" />
</xs:complexType>

<xs:complexType name="FanOut">
    <xs:sequence minOccurs="0" maxOccurs="unbounded">
        <xs:group ref="ice:Statements" />
    </xs:sequence>
    <xs:attribute name="targetRootElement" type="xs:QName" use="required" />
    <xs:attribute name="correlationPredicate" type="xs:string" use="optional" />
    <xs:attribute name="noMatches" type="ice:eventDeliveryOptionNoMatches"
                  use="optional" />
    <xs:attribute name="oneMatch" type="ice:eventDeliveryOptionOneMatch"
                  use="optional" />
    <xs:attribute name="multipleMatches"
                  type="ice:eventDeliveryOptionMultipleMatches"
                  use="optional" />
</xs:complexType>

<xs:complexType name="Terminate" />
```

FIG. 19
(cont'd)

```xml
<xs:simpleType name="eventDeliveryOptionNoMatches">
    <xs:restriction base="xs:string">
        <xs:enumeration value="ignore" />
        <xs:enumeration value="signalError" />
        <xs:enumeration value="rollBack" />
        <xs:enumeration value="rollBackAndRetry" />
        <xs:enumeration value="createNewTarget" />
    </xs:restriction>
</xs:simpleType>

<xs:simpleType name="eventDeliveryOptionOneMatch">
    <xs:restriction base="xs:string">
        <xs:enumeration value="ignore" />
        <xs:enumeration value="signalError" />
        <xs:enumeration value="rollBack" />
        <xs:enumeration value="rollBackAndRetry" />
        <xs:enumeration value="deliverToTarget" />
    </xs:restriction>
</xs:simpleType>

<xs:simpleType name="eventDeliveryOptionMultipleMatches">
    <xs:restriction base="xs:string">
        <xs:enumeration value="ignore" />
        <xs:enumeration value="signalError" />
        <xs:enumeration value="rollBack" />
        <xs:enumeration value="rollBackAndRetry" />
        <xs:enumeration value="deliverToAny" />
        <xs:enumeration value="deliverToAll" />
    </xs:restriction>
</xs:simpleType>

</xs:schema>
```

US 8,627,299 B2

VIRTUAL MACHINE AND PROGRAMMING LANGUAGE FOR EVENT PROCESSING

CROSS-REFERENCE TO RELATED APPLICATIONS

The present application is related to commonly-assigned U.S. patent application Ser. No. 12/040,461, titled "Compiler for a Declarative Event-Driven Programming Model" (hereinafter, "the first related application"), and to commonly-assigned U.S. patent application Ser. No. 12/040,508, titled "Debugger for a Declarative Event-Driven Programming Model" (hereinafter, "the second related application"), both of which were filed concurrently herewith and which are hereby incorporated herein as if set forth fully.

RESERVATION OF COPYRIGHT

A portion of the disclosure of this patent document contains material to which a claim of copyright protection is made. The copyright owner has no objection to the facsimile reproduction by anyone of the patent document or the patent disclosure, as it appears in the Patent and Trademark Office patent file or records, but reserves all other rights whatsoever.

BACKGROUND OF THE INVENTION

The present invention relates to computers, and deals more particularly with virtual machines and programming languages used for event processing (e.g., in business monitoring and/or business integration environments).

Event-driven application programs play an increasingly important role in business monitoring and business integration. The WebSphere® Business Integration platform from International Business Machines Corporation ("IBM"), for example, supports a number of different types of event-driven executables for business environments. These types of executables include state machines, rules for complex event processing ("CEP") and event correlation, and monitoring contexts. ("WebSphere" is a registered trademark of IBM in the United States, other countries, or both.)

In business monitoring and business integration environments, events are typically conveyed as messages. Message-driven executables include processes and mediations.

BRIEF SUMMARY OF THE INVENTION

The present invention is directed, in a first aspect, to a virtual machine that executes event processing. In one embodiment, this aspect comprises: executing instructions from a program using a virtual machine on a computer, wherein the instructions comprise at least one of: an event instruction for receiving an inbound event; an assignment instruction for assigning a value; a branch instruction for conditional transfer to a different one of the instructions; an emit instruction for specifying that an outbound event is to be emitted; a terminate instruction for specifying that a current execution context object is to be terminated; and a fan-out instruction for at least one of specifying event correlation and enabling a context switch.

The instructions may be generated from an event-driven model specification, and/or from a message-driven model specification. Instructions from a plurality of programs may be executed using the virtual machine on the computer, and the plurality of programs may be generated from at least two different execution models.

Executing the event instruction may further comprise: executing the event instruction to receive a particular inbound event; locating a fan-out instruction associated with the event instruction; executing the located fan-out instruction to determine, using correlation predicate information associated with the located fan-out instruction, whether any current execution context object is capable of further processing the particular inbound event; and directing the particular inbound event to each determined capable execution context object, if any, for the further processing therein.

The event instruction for receiving an inbound event may also filter the inbound event. Executing the instructions using the virtual machine may further comprise determining which of a plurality of event instructions from the program to execute, upon receiving a particular inbound event, by comparing a type declared by the particular inbound event to a type specification, when present, in each of the plurality of event instructions.

Executing the assignment instruction may further comprise: evaluating an expression of the assignment instruction; and assigning, as the value, a result of the evaluating to a target identified by the assignment instruction. Executing the branch instruction may further comprise evaluating a condition expression of the branch instruction, and the conditional transfer may further comprise next executing the different one of the instructions, as identified by an attribute of the branch instruction, when the evaluation returns a true result, and otherwise next executing a next sequential one of the instructions. Executing the emit instruction may further comprise emitting, to an event bus, the outbound event. Executing the emit instruction may further comprise evaluating an expression specified on the emit instruction and reflecting a result of the evaluating in the outbound event prior to the emitting. Executing the terminate instruction may further comprise terminating the current execution context object.

The present invention is directed, in a second aspect, to a programming language for event processing. In one embodiment, this aspect comprises a computer-readable medium storing source code written in a programming language, wherein the programming language comprises an event instruction for receiving an inbound event; an assignment instruction for assigning a value; a branch instruction for conditional transfer to a different one of the instructions; an emit instruction for specifying that an outbound event is to be emitted; a terminate instruction for specifying that a current execution context object is to be terminated; and a fan-out instruction for at least one of specifying event correlation and enabling a context switch, and wherein the source code comprises a plurality of the instructions in the programming language. In another embodiment, this aspect comprises a program of instructions storable on a computer-readable medium for causing a computer to execute, wherein the instructions comprise a plurality of: an event instruction for receiving an inbound event; an assignment instruction for assigning a value; a branch instruction for conditional transfer to a different one of the instructions; an emit instruction for specifying that an outbound event is to be emitted; a terminate instruction for specifying that a current execution context object is to be terminated; and a fan-out instruction for at least one of specifying event correlation and enabling a context switch. The programming language may be used for programs generated from an event-driven model specification and/or from a message-driven model specification Embodiments of these and other aspects of the present invention may be provided as methods, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

BRIEF DESCRIPTION OF THE SEVERAL VIEWS OF THE DRAWINGS

FIGS. 8-13 provide examples of a state machine model, event type specification, event, context object type specification, context object, and Ice program for the state machine execution, respectively;

FIGS. 14-17 provide examples of a monitor model, compiler-generated output file, compiler-generated cross-reference file, and sample context object type specification, respectively;

FIG. 19 provides a sample schema for the Ice language;

DETAILED DESCRIPTION OF THE INVENTION

In one aspect of the present invention, a programming language is defined. This programming language may be termed a "machine-level" programming language. In another aspect of the present invention, a processing engine, referred to equivalently herein as a virtual machine, is disclosed.

Two different communication styles may be used in business monitoring and business integration, namely remote method invocation (using remote procedure call, or "RPC", communication) and event-based communication. Aspects of the present invention are directed to event-based communication. Event-based communication may alternatively be referred to as "one-way" message-based communication between event producers and event consumers. Such one-way messages may be exchanged using a direct addressing style or by using a publish-subscribe approach. Communication in a business monitoring scenario is typically event-based, while communication in a business integration scenario may use either style.

These communication styles may alternatively be described in terms of their routing algorithms, noting that the routing algorithms used in message-based and event-based programming are different. A routing algorithm for message-based programming typically uses a directed or "push" model, whereas a routing algorithm for event-based programming typically uses a subscription or "pull" model. However, it is observed that the same set of basic steps or functions are used to process events or messages that have arrived at an endpoint. Accordingly, embodiments of the present invention are not limited to use with event-driven executables, and message-driven executables such as processes and mediations are also within the scope of executables addressed by the present invention.

The basic steps for processing events or messages generally comprise: receiving an event/message; filtering the received event/message; correlating the event/message with one or more execution context objects (and these objects may represent, depending on the higher-level programming model, state machine execution contexts, CEP lifespans, monitoring contexts, process execution contexts, mediation contexts, etc.); updating an internal state of target execution context(s) based on the event/message content; evaluating conditions and performing conditional branching; emitting outbound event(s)/message(s) if warranted (such as state transition events in the case of a state machine model, aggregated messages in the case of CEP rules, alerts in the case of a monitoring context, start messages for the next activity in the case of a process model, and mediated messages in the case of a mediation); and creating or terminating an execution context object.

Figure 1:
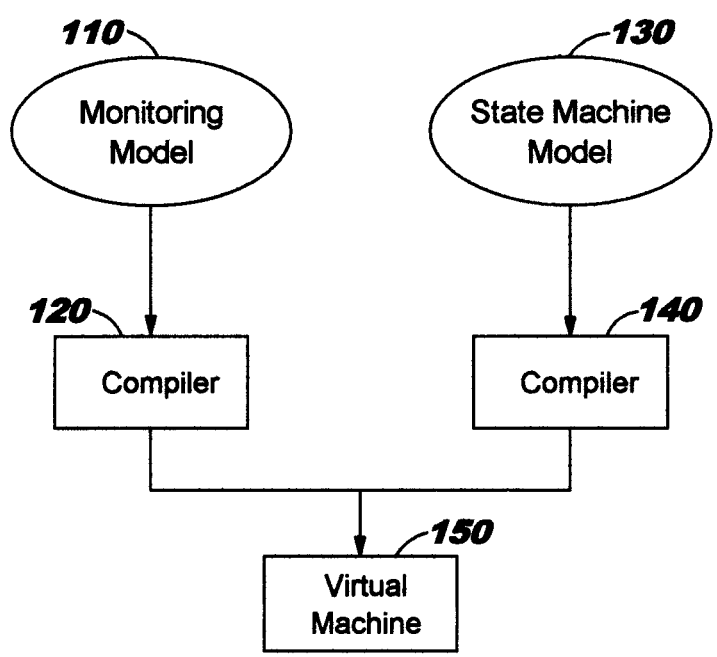
FIG. 1 illustrates use of multiple higher-level programming models with a single virtual machine for supporting applications previously supported with custom engines, according to an aspect of the present invention.

While the higher-level programming model (i.e., the state machine, CEP, monitor, process, mediation, etc.) may be used to define such executables in a user-friendly fashion, one aspect of the present invention defines a programming language comprising a relatively simple instruction set into which these models may be compiled as an executable. This compiled executable may then be executed on a virtual machine as disclosed herein. Notably, compiled executables from different ones of the higher-level programming models may be executed on this same virtual machine (as will be described below with reference to FIG. 1).

By contrast, prior art business integration platforms typically use different execution environments for each higher-level programming model, providing "custom engines" for each kind of executable supported by the platform. If a particular platform supports state machines, rules for complex event processing and event correlation, monitoring contexts, processes, and mediations, for example, it may become unwieldy to manage and maintain the platform and its various engines or execution environments.

The virtual machine disclosed herein enables reducing the number of supported execution environments to one. Cost savings may be realized, for example by focusing on a single virtual machine implementation's development, performance optimization, administrative and operational interfaces, documentation, and so forth.

The programming language disclosed herein enables using this single virtual machine for supporting applications previously supported with custom engines. Different higher-level programming models are supported using different compilers. See FIG. 1, which illustrates this approach. As shown therein, a first compiler 120 usable with a declarative program for a monitoring model 110 provides code that is executable using a virtual machine 150, and a second compiler 140 usable with a state machine model 130 provides code that is executable using this same virtual machine 150. The abstraction provided by this approach may also facilitate portability of the execution environment to different hardware platforms and operating systems.

Embodiments of the present and related inventions are preferably used in an application environment where events are distributed using publish-subscribe communication, where event subscribers receive events from one or more event sources (publishers) and process those events. However, embodiments of the present and related inventions may alternatively be used in an application environment based on a message paradigm, where message producers send messages to particular targets (i.e., message receivers), as long as those messages meet the subscription criteria of an Ice program deployed at a target; these criteria will be discussed in more detail below.

Sending and receiving of events may follow an "event bus" paradigm, whereby inbound events are considered as being received from a bus (which may, for example, be implemented as a queue or other data storage and transmission technology) that connects event sources with event receivers, and whereby outbound events are considered as being delivered to this bus for transmission to interested listeners.

The programming language defined herein uses a relatively small number of instructions, which are designed to support the above-described basic steps or functions. Borrowing terminology from the domain of processor architecture, this may be referred to as a "reduced instruction set" or "RISC" approach for event-processing applications (or message-processing applications, alternatively). Note that this programming language may be generated by a compiler, and is not generally intended for use by human programmers. (One such compiler is disclosed in the first related application, and pertains to a monitoring context model.)

The instruction set used in this programming language comprises, in one approach, six instructions. Each of those instructions will now be described.

An "onevent" instruction or statement corresponds generally to receiving a single inbound event, and specifies an inbound event "subscription" (i.e., information specified for subscribing to an inbound event). The Extensible Markup Language, or "XML", notation is preferably used to specify inbound events and outbound events, including the content or "payload" of such events. Accordingly, the onevent instruction may refer to elements and attributes from an XML document (or document fragment) in the inbound event. In a preferred embodiment, the onevent instruction comprises a "filter" attribute whose Boolean condition represents the subscription criterion: any event whose content satisfies the filter condition is considered as satisfying the subscription of this onevent statement. When such an event arrives at the virtual machine, it is processed by the statement(s) subordinate to the onevent, where those subordinate statements are also taken from the instruction set disclosed herein. Those subordinate statements will now be described.

A "fanOut" instruction or statement is provided, and enables event correlation and context switching. The first fanOut instruction following an onevent statement executes in the context of the incoming event, and correlates the event with zero or more context objects which become the initial execution context for processing the event. Subsequent fanOut statements execute in the context of the current context object, and correlate the event with zero or more new context objects, thereby enabling a context switch from the current context object to the new context object(s); these new context objects will become the execution context for the subsequent instructions within the scope of the fanOut statement.

An "assign" instruction or statement corresponds generally to assigning a value to a slot of the current context object (which may represent a state machine context, monitoring context, process execution context, etc.) or to a slot of an outbound event. In preferred embodiments, the right-hand side of an assignment statement is an expression that depends on 1-values or slots in the current context object (if there has been a fanOut establishing such a context object) and in the incoming event (which is considered part of the execution context).

A "branch" instruction or statement corresponds generally to a conditional transfer of control to a prior or succeeding step in the program, and may specify a "distance" attribute to indicate a relative offset of the instruction to which control will transfer when the branch is executed. A positive value for the distance attribute indicates jumping forward in the execution sequence, and a negative value indicates that control is to transfer to a prior instruction. In preferred embodiments, the branch condition is a Boolean expression for whose 1-values the same rules apply as discussed above for the right-hand side of an assign statement. If the branch condition evaluates to true, the branch is taken; otherwise, execution continues with the statement following the branch instruction.

An "emit" instruction or statement corresponds generally to specifying that an outbound event is to be emitted. This instruction is typically used after one or more slots of the outbound event have been populated (e.g., by executing assign instructions).

A "terminate" instruction or statement corresponds generally to specifying that the current context object (which may represent a state machine context, monitoring context, process execution context, etc.) should be terminated.

Optionally, a "macro" instruction or statement may also be supported. This instruction may be used to encapsulate reusable blocks of instructions.

The term "Ice" is used herein to refer to this programming language. "Ice" is derived from the term "intermediate code", and indicates that a program written in this language is preferably an intermediate step in execution, representing compiled output which is derived from source code written in another notation and which is then executed in a virtual machine environment as described herein. One possible algorithm to derive an Ice program from a monitor model is disclosed in the first related application. (Notably, the programming language disclosed herein is preferably generated by a compiler, and is not generally intended for writing by a user.)

By reducing the instructions in the programming language to those described herein, portability may be facilitated, and economies may be realized in implementation and optimization of the single runtime environment. Showing the execution steps of the intermediate code in conjunction with the original source, as described in the first and second related applications, can provide a user with a "useful" granularity of information for viewing during debugging. For example, it is not deemed useful to allow the user to step through each operation involved in evaluating an arithmetic expression or each operation involved in persisting a value in a database while debugging an event-driven program. Instead, it is assumed that basic operations of this type can be carried out without error. Accordingly, preferred embodiments of the compiler disclosed in the first related application (which generates code in the programming language defined herein) do not generate code for such primitive operations (and the debugger disclosed in the second related application does not provide for stepping through them), but instead such operations are encapsulated in lower-level routines which the compiled code invokes as needed, thus providing an appearance of "atomic" operations to a user attempting to debug a higher-level program. This is expected to not only make debugging less confusing for the user, but is expected to also reduce the complexity of the compiled code (which in turn is expected to generally improve the compilation process and the run-time efficiency of the generated code).

This approach is in contrast to known code generators for higher-level programming models used in business monitoring and business integration, which may produce code in the Java® programming language. ("Java" is a registered trademark of Oracle America, Inc. in the United States, other countries, or both.) Such code generators typically generate code containing many steps, such as method invocations, initialization and management of internal variables, exception handling, and so forth that may complicate the logic of the code generator. Furthermore, the code generated by these known code generators may add too much "uninteresting detail" for a user trying to debug the original source program.

Analyzing a desired runtime environment for the aforementioned higher-level programming models, it may be seen that three aspects should be addressed: a type system, an expression language, and execution logic (i.e., instruction sequencing). For event processing, a preferred embodiment of the present invention uses XML schema for the type system, the well-known XPath notation for the expression language, and the Ice language disclosed herein to specify the execution sequence for processing events in the realm of a receiving context object. The type system and expression language are pluggable, however, and thus the same Ice-language programming model can be used with different type systems and different expression languages. (The virtual machine disclosed herein may delegate expression evaluation to a plugged-in component, for example, and a different expression language may then be substituted by reconfiguring the virtual machine to use a different expression evaluation component.)

The run-time behavior provided by a preferred embodiment of an implementation of the present invention will now be described.

An execution context approach used in preferred embodiments will now be described. An incoming event may be processed in a particular context which may be modeled using a type definition language such as XML Schema. Accordingly, the incoming event may be processed in the context of zero or more context objects, which may be persistent (that is, reusable across several incoming events) or temporary (that is, terminated after an event has been processed).

Context objects have a type associated therewith, and in one approach, are managed in a virtual container (referred to equivalently herein simply as a container). If the context object's type declares a "key" attribute, then the context object may be instantiated multiple times in a container, where each instance has a different (i.e., unique) key value. If the context object's type does not declare a key attribute, then the context object may be instantiated only once, providing a single "static" instance in the container.

Preferably, the container manages the life cycle and persistence of the context objects it contains, and processes incoming events on these objects based on the set of event-processing programs it has loaded. Semantics descriptions for such programs will now be discussed with reference to FIG. 2.

Event subscriptions are managed by directing events to a subscriber. In preferred embodiments of the present invention, the container assumes the role of the event subscriber. When an event arrives at a container, it is tested against the filter of any onevent instructions in programs that may have been loaded by this container. Each onevent statement whose filter evaluates to true is executed in the context of the incoming event, including processing all nested instructions (e.g., fanOut, assign, branch, emit, and/or terminate instructions) of that onEvent statement.

A fanOut instruction is provided as one nested instruction of an onevent statement. According to preferred embodiments, the fanOut statement specifies a target object type and a correlation predicate that is used to identify the target object instance(s) in whose context the instructions following the fanOut are executed.

Figure 2:
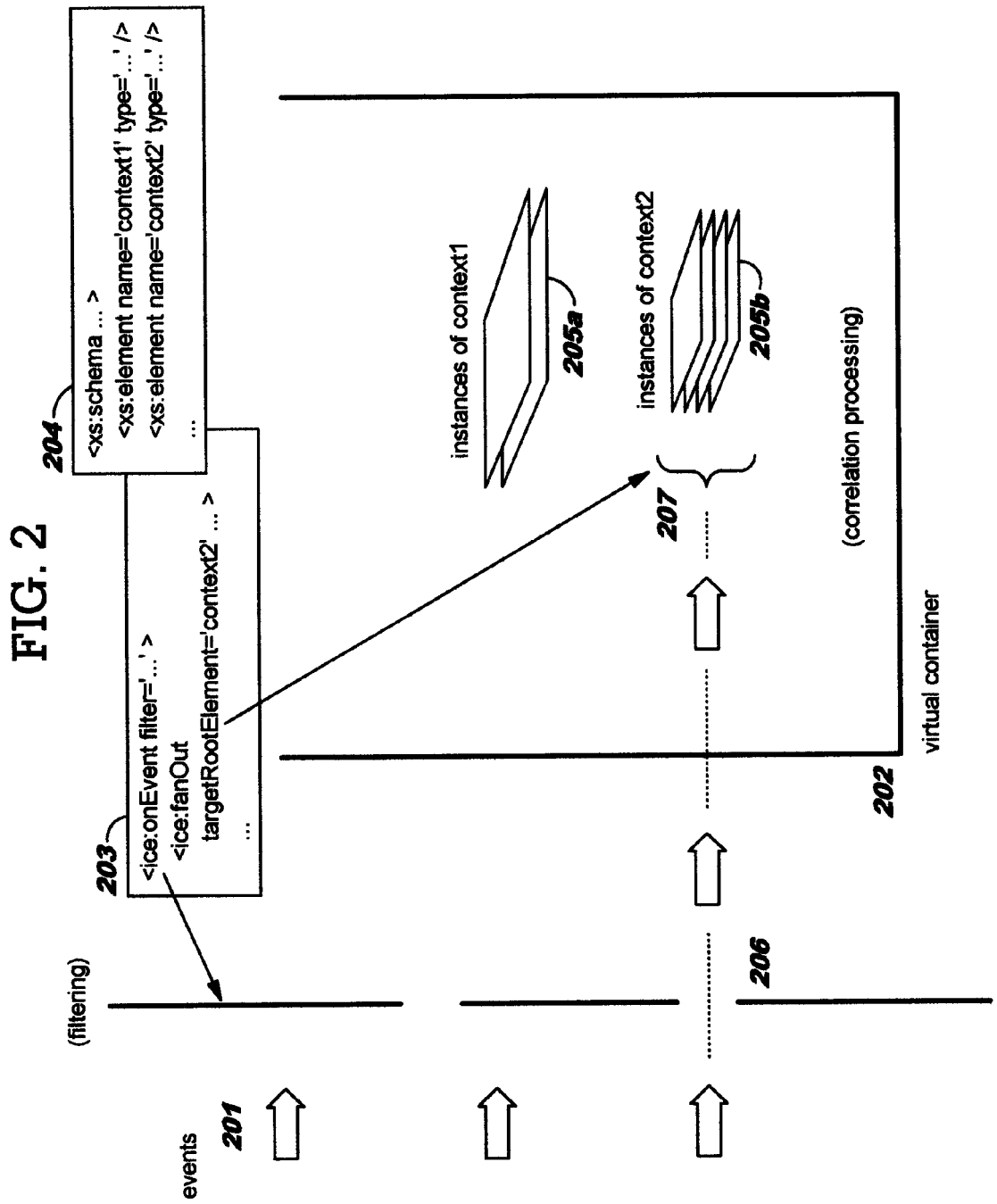
FIG. 2 illustrates processing of an inbound event, according to an aspect of the present invention.

The semantics of onevent and fanOut are illustrated in FIG. 2. Events 201 are directed to a virtual container 202 which has loaded one or more Ice programs 203 and associated type definitions 204. At the point in time illustrated in FIG. 2, two instances of "context1" 205a and four instances of "context2" 205b have been instantiated in the container. The onevent statements in all loaded Ice programs 203 represent the container's event subscriptions. Any event 201 directed to the container 202 is tested against each subscription, and the event is said to "pass the filter" 206 if the event satisfies the filter condition. An event that has passed the filter of an onevent statement is processed by the subordinate statements of that onevent statement. A fanOut statement correlates the event with zero or more instances of a certain context object type in the container. See 207. Statements subordinate to the fanOut statement are then processed in the context of that object.

Semantics of other instructions, including assign, branch, emit, and terminate, correspond to well-known usage of such instructions from other programming languages.

Referring now to FIGS. 3-6, processing of an Ice program within a virtual machine according to a preferred embodiment of the present invention will now be described.

Figure 3:
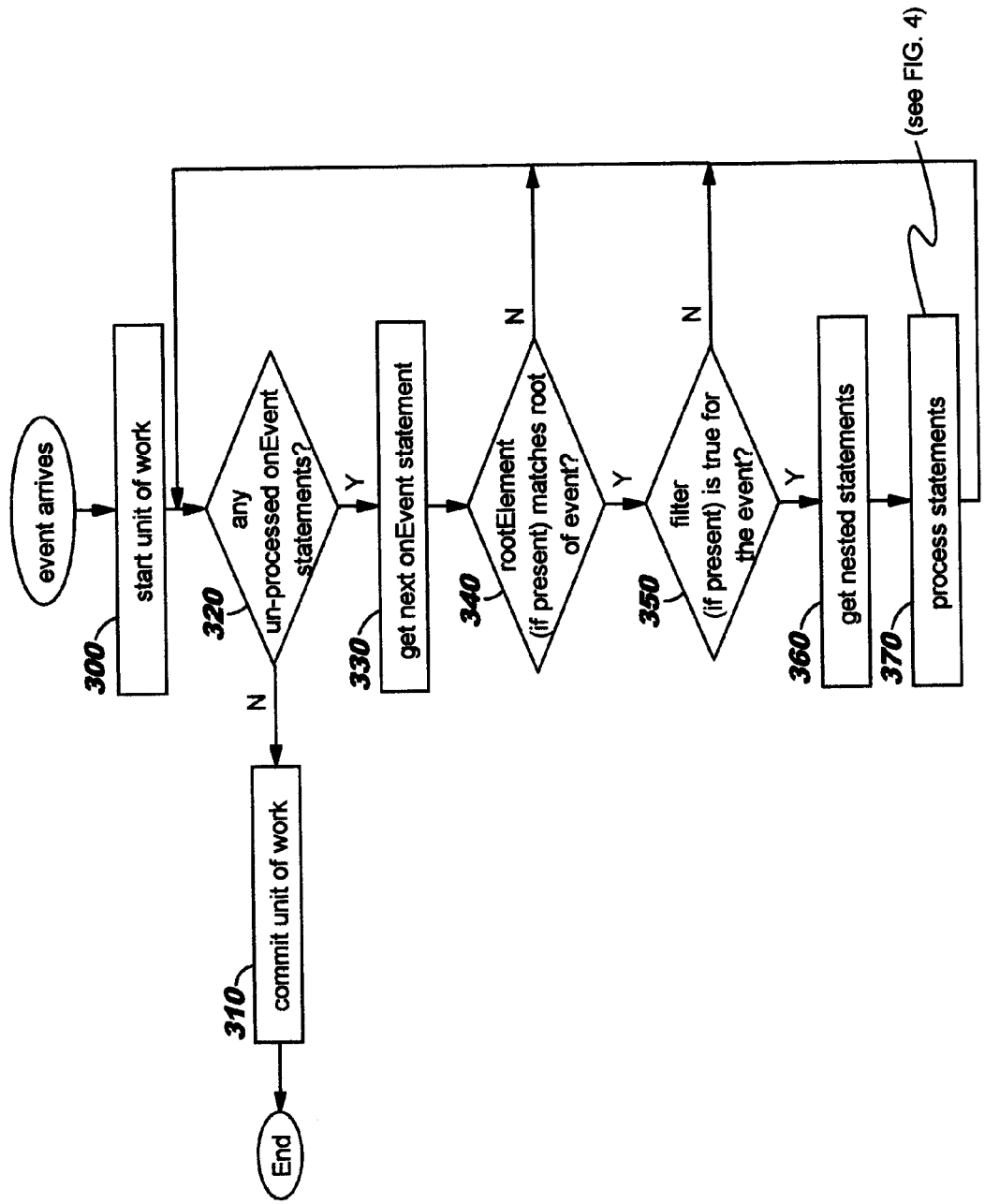
FIGS. 3-6 provide flowcharts depicting logic which may be used for processing of an "Ice" program within a virtual machine, according to an aspect of the present invention.

FIG. 3 provides a flowchart depicting logic which may be used for processing of an incoming event that arrives at a virtual container. In preferred embodiments, a container has an address, such as a Uniform Resource Locator ("URL"), to which an event may be directed. A unit of work, or transaction, is started (Block 300) for this incoming event. Block 320 tests whether any onevent statements remain to be processed against this incoming event. Preferred embodiments evaluate each onevent statement of an Ice program deployed at this container in document order. If the test in Block 320 has a negative result, then at Block 310, the unit of work is committed (which may include emitting outbound events, as discussed below with reference to FIG. 6B). The processing of this event then ends. When at least one unprocessed onevent statement remains, however, the test at Block 320 has a positive result and processing therefore continues at Block 330.

Block 330 gets the next onevent statement. Block 340 tests whether a rootElement attribute of this onevent statement (if present therein) matches the fully-qualified name of the inbound event's document root. If not, then processing returns to Block 320 to check for additional onevent statements in this Ice program or in other Ice programs loaded in this container. Otherwise, when there is a match in the root element, processing continues at Block 350.

Block 350 evaluates a filter attribute of this onevent statement, if present, based on the inbound event. If the filter evaluates to true (or if no filter attribute is present), processing continues at Block 360; otherwise, control returns to Block 320.

Figure 4:
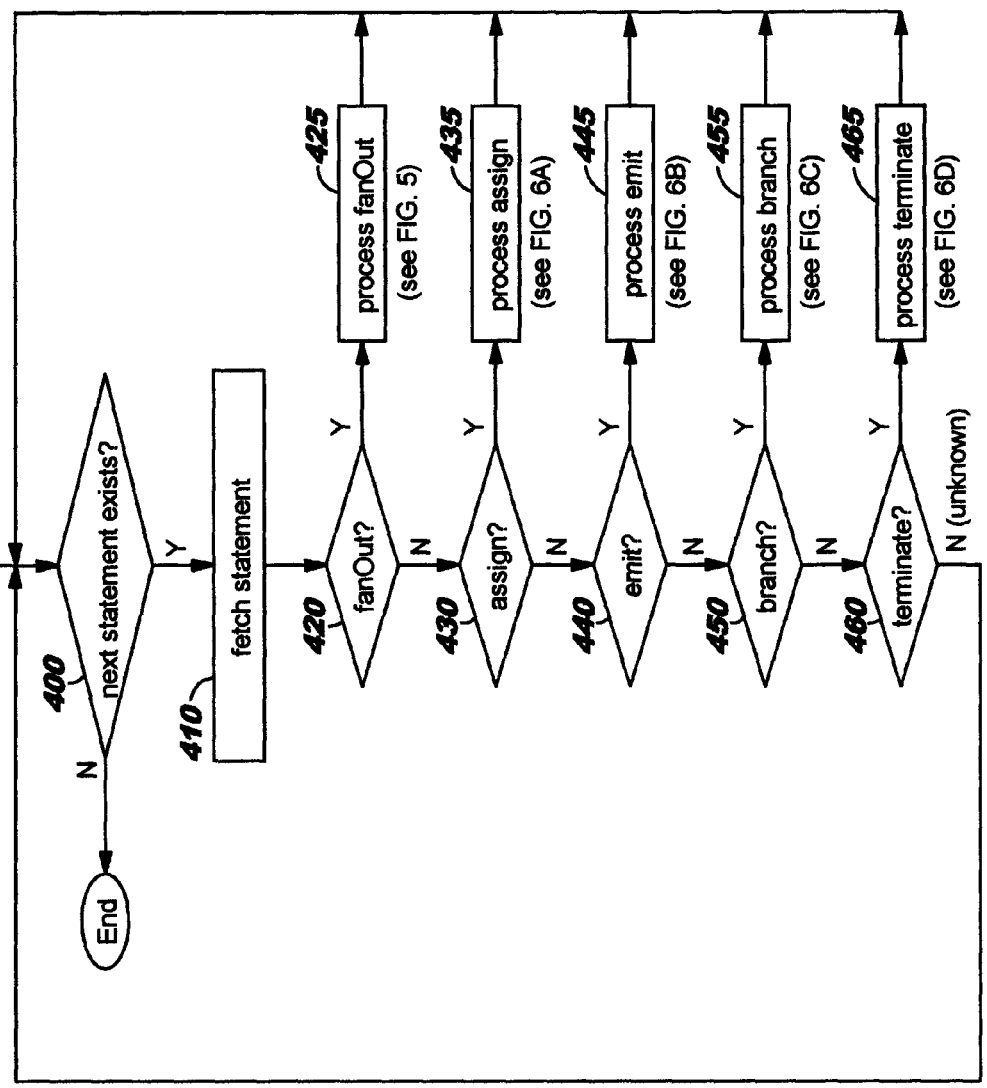

At Block 360, nested statements of this onevent statement are obtained, and those statements are processed at Block 370, which is illustrated in more detail in FIG. 4. Control then returns to Block 320.

FIG. 4 provides a flowchart depicting logic which may be used for processing nested statements of an onevent statement. Block 400 of FIG. 4 tests whether a next nested statement exists. If not, then processing exits from FIG. 4. Otherwise, processing continues at Block 410, which fetches that next statement.

Block 420 then tests whether the fetched statement is a fanOut statement. If so, the fanOut statement is processed at Block 425, after which control returns to Block 400 to check for yet another next statement. Block 425 is described in more detail in FIG. 5. When the test at Block 420 has a negative result, processing continues at Block 430.

Block 430 tests whether the fetched statement is an assign statement. If so, the assign statement is processed at Block 435, after which control returns to Block 400. Block 435 is described in more detail in FIG. 6A. When the test at Block 430 has a negative result, processing continues at Block 440.

Block 440 tests whether the fetched statement is an emit statement. If so, the emit statement is processed at Block 445, after which control returns to Block 400 to check for yet another next statement. Block 445 is described in more detail in FIG. 6B. When the test at Block 440 has a negative result, processing continues at Block 450.

Block 450 tests whether the fetched statement is a branch statement. If so, the branch statement is processed at Block 455, after which control returns to Block 400. Block 455 is described in more detail in FIG. 6C. When the test at Block 450 has a negative result, processing continues at Block 460.

Block 460 tests whether the fetched statement is a terminate statement. If so, the terminate statement is processed at Block 465, after which control returns to Block 400. Block 465 is described in more detail in FIG. 6D. When the test at Block 460 has a negative result, then processing preferably returns to Block 400. In addition or instead, an error condition may be generated to indicate that an unknown statement has been encountered.

Figure 5:
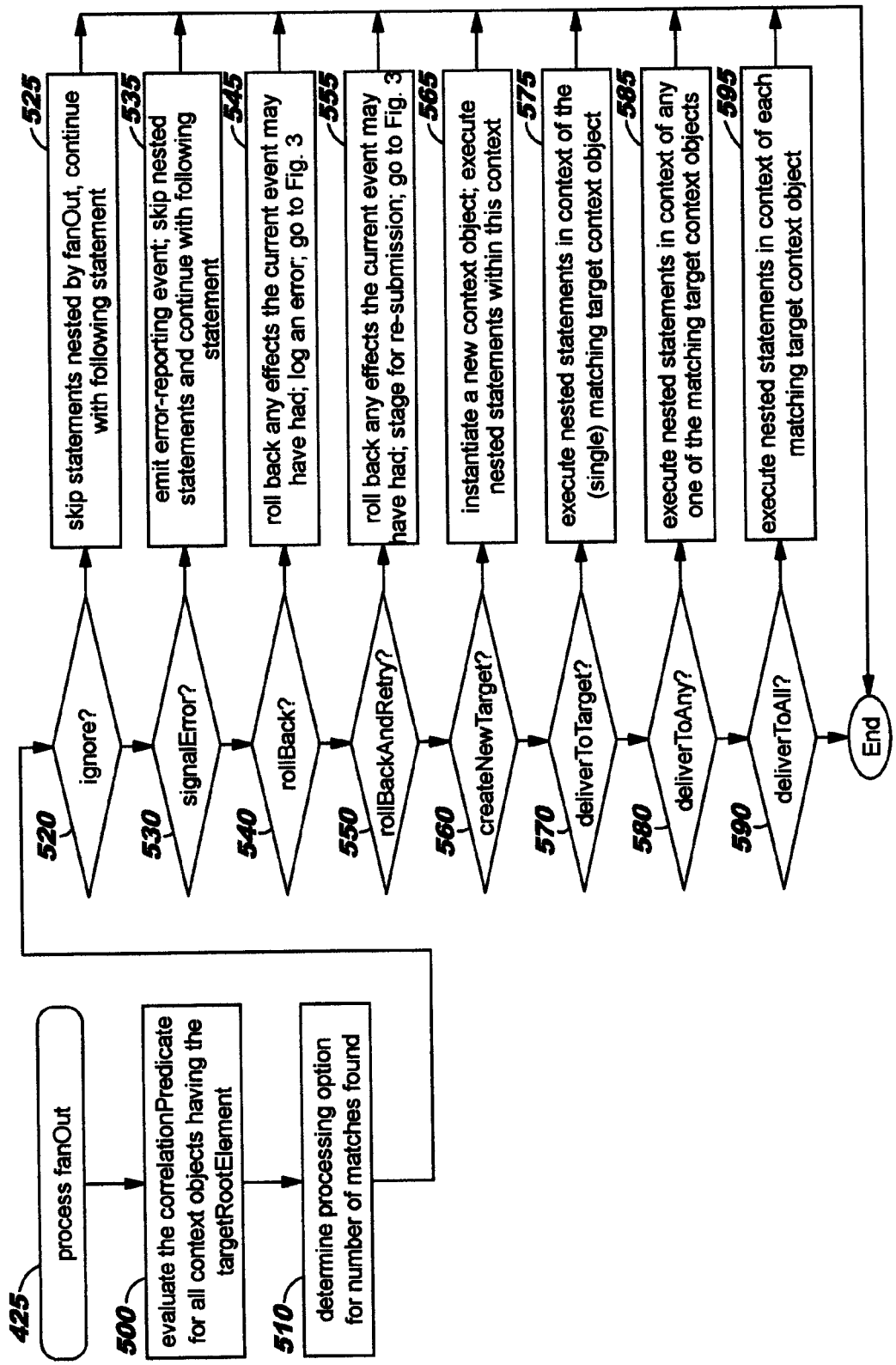

Referring now to FIG. 5, a flowchart is provided depicting logic which may be used for processing of a fanOut statement, as will now be described. At Block 500, the correlation predicate of this fanOut statement is evaluated for all context objects in this container whose root element name matches the value of the "targetRootElement" attribute of the fanOut statement. (See 1323 of FIG. 13 for a sample targetRootElement attribute.) If this attribute is not present on the currently-evaluated fanOut statement, then according to preferred embodiments the correlation predicate is evaluated for all loaded context objects.

Block 510 determines the processing option to be used, in view of how many matches were found at Block 500. Preferred embodiments provide handling for no matches, for one match, and for more than one match. A fanOut statement may therefore specify attributes for each of these cases, and the value of the applicable one of these attributes determines how the currently-processed event will be processed by this fanOut statement. With reference to the sample compiler-generated executable 1300 of FIG. 13, for example, the fanOut element at 1320 specifies that a new context object is to be created if there are no matches to the correlation predicate amongst the context objects whose root element name matches the targetRootElement value (see 1325, where the attribute value "createNewTarget" is specified as the value of the "noMatches" attribute in this example), and that the event is to be delivered to the single matching context object if there is only one match (see 1326, specifying "deliverToTarget" as the attribute value for the value of the "oneMatch" attribute in this example), and that an error condition exists if there is more than one match (see 1327, specifying "signalerror" as the value of the "multipleMatches" attribute in this example).

The logic of Blocks 520-595 specifies options implemented by preferred embodiments for processing the fanOut statement, according to the attribute value specified in the appropriate one of these "match"-related attributes. According to preferred embodiments, the first four of these processing options (i.e., as represented by Blocks 520-555) may be used as the attribute value for any of the three match-related attributes of a correlation predicate; the "createNewTarget" option can only be used as the attribute value for the "noMatches" attribute; the "deliverToTarget" option can only be used as the attribute value for the "oneMatch" attribute; and the final two of these processing options (i.e., as represented by Blocks 580-595) can only be used as the attribute value for the "multipleMatches" attribute. The processing that corresponds to each attribute value, according to preferred embodiments, will now be described.

Block 520 tests whether the currently-processed event should be ignored by this fanOut statement (i.e., whether the applicable attribute value determined at Block 510 is "ignore"). If so, then the statements nested by this fanOut statement are skipped and processing continues with the next statement following this fanOut statement, as stated at Block 525, and the processing in FIG. 5 therefore exits.

Otherwise, processing continues at Block 530, which tests whether an error should be signalled (i.e., whether the applicable attribute value determined at Block 510 is "signalError"). If so, then Block 535 comprises emitting an error-reporting event. This error-reporting event preferably wraps the currently-processed inbound event and is staged for emission when the current transaction commits. The statements nested by this fanOut statement are skipped. Processing then continues with the next statement following this fanOut statement, and the processing in FIG. 5 therefore exits.

Processing reaches Block 540 when the applicable attribute value was not "ignore" or signalError". Block 540 then tests whether the applicable attribute value is "rollBack". If so, then Block 545 comprises rolling back the transaction started for the currently-processed event, such that any effects of that event on execution contexts are undone and any outbound events pending for emission will not be sent. An error may be logged, if desired by an implementation of the present invention. Processing in FIG. 5 then exits, branching to FIG. 3 to fetch the next event (if any) from the queue.

Block 550 tests whether the applicable attribute value is "rollBackAndRetry". If so, then Block 555 comprises rolling back the transaction started for the currently-processed event, as described above with reference to Block 545. However, rather than logging an error, the currently-processed event is placed on a retry queue, from which it will be dequeued and evaluated again. (The timing of this retry, as well as the number of times a retry may be attempted, is implementation dependent.) Processing in FIG. 5 then exits, branching to FIG. 3 to fetch the next event (if any) from the queue.

Block 560 tests whether the applicable attribute value, as determined by Block 510, is "createNewTarget". If so, then Block 565 comprises instantiating a new context object (and preferably, assigning default values thereto) and making this the current execution context; the statements nested within this fanOut are then executed in the context of this new target context object. Note that if any of the statements nested within this fanOut statement specify a "currentKey( )" function, preferred embodiments invoke this function to return a new, unique key and assign that key value to a key slot of the new context object. Processing in FIG. 5 then exits.

Block 570 tests whether the applicable attribute value is "deliverToTarget". If so, then Block 575 comprises delivering the currently-processed event to the (single) matching execution context for processing it therein by executing the statements nested by this fanOut. Processing in FIG. 5 then exits.

Block 580 tests whether the applicable attribute value is "deliverToAny". If so, then Block 585 comprises delivering the currently-processed event to any (single one) of the matching execution contexts for processing it therein by executing the statements nested by this fanOut. The manner in which that execution context is selected from the set of matching execution contexts is implementation dependent. Processing in FIG. 5 then exits.

Finally, Block 590 tests whether the applicable attribute value is "deliverToAll". If so, then Block 595 comprises delivering the currently-processed event to all of the matching execution contexts for processing it therein by executing the statements nested by this fanOut. Processing in FIG. 5 then exits.

FIGS. 6A-6D provide flowcharts illustrating logic which may be used when implementing the assign, emit, branch, and terminate statements, respectively, as will now be described.

Figure 6A:
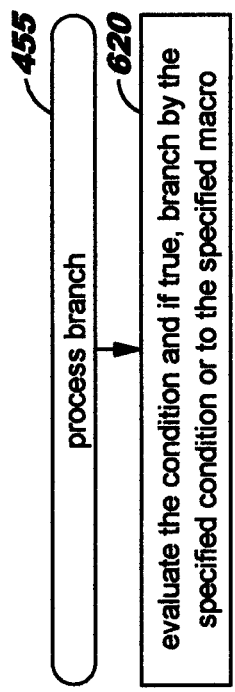

Referring next to FIG. 6A, processing of an assign statement will now be described in more detail. At Block 600, the assign statement is processed by evaluating its "value" expression and assigning the result of that evaluation to the slot referenced by the "target" expression. See, for example, the value expression 1396 and target expression 1395 of the assign statement at 1394 in FIG. 13. According to preferred embodiments, the target expression is evaluated to identify a well-defined slot of the current context object or of the payload of a to-be-emitted outbound event, and the assignment overwrites any previously-existing value of that slot with the expression specified in the value attribute of the assign statement. (To add items to a sequence, the value expression may be specified as the union of the existing slot value and the to-be-added value.) Processing in FIG. 6A then exits.

Figure 6C:
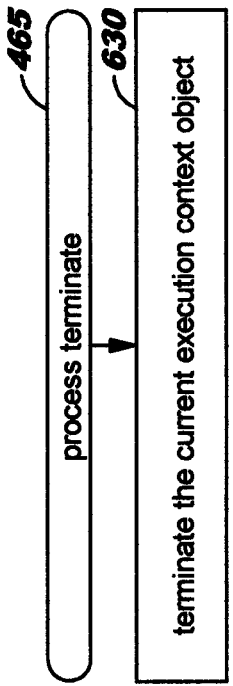
Figure 6B:
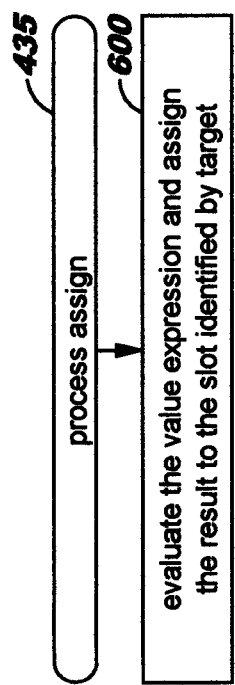

Processing of an emit statement will now be described in more detail with reference to FIG. 6B. At Block 610, the emit statement is processed by evaluating its "event" expression, which typically results in creating a document fragment (which is an XML document fragment, according to preferred embodiments) and sending this document fragment to the event bus (from which it will subsequently be sent when the current unit of work commits). An emit statement has not been illustrated in FIG. 13. Processing in FIG. 6B exits after sending the document fragment to the event bus.

Processing of a branch statement will now be described in more detail with reference to FIG. 6C. At Block 620, the branch statement is processed by evaluating its "condition" expression. Preferably, this condition expression is specified using XPath notation. See, for example, the condition attribute at 1331 of FIG. 13. If the condition evaluates to false, then execution continues with the next statement following the branch statement; otherwise (including the case where the condition is absent, which preferred embodiments treat as an unconditional branch), execution continues at a statement identified by the branch. In one approach, this statement is identified using a "distance" attribute. In another approach, this statement is identified using a "macro" attribute. In a third approach, neither a "distance" or a "macro" attribute is specified. Each of these approaches will now be described in more detail.

When a distance attribute is present, as illustrated at 1332 in FIG. 13, execution branches by the indicated number of statements. The value of the distance attribute may be positive or negative. A distance value of 1 simply continues execution at the next-sequential statement. In preferred embodiments, if the value of the distance attribute indicates a statement outside the nearest enclosing onevent or fanOut block, then the branch is executed as if neither a distance or macro attribute is specified (as discussed below).

When a macro attribute is present, execution continues as if the statements identified by the value of the macro attribute (which preferably references a <macro> element identifier) were inserted inline, in place of the branch statement.

When neither a distance or a macro attribute is specified, the branch statement leaves the current onevent or fanOut block if the branch is taken. If the current block is an onevent statement, then execution continues by processing the next onevent block in this Ice program. If the current block is a fanOut statement, then execution continues by either re-executing the statements within the fanOut block in the context of the next target context object, or by processing the next statement in the Ice program when there are no further matching target context objects.

Specifying both a distance attribute and a macro attribute is an error condition, according to preferred embodiments.

After processing the branch statement as described above, processing in FIG. 6C then exits.

Figure 6D:
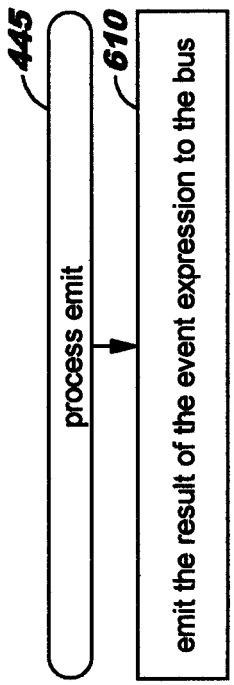

Processing of a terminate statement will now be described in more detail with reference to FIG. 6D. At Block 630, the processing of the terminate statement comprises terminating the current context object, which is thereby removed from this container. Processing then exits from FIG. 6D.

Embodiments of the present invention may be used in combination with embodiments of the inventions disclosed in the first related application and the second related application (hereinafter, "the related inventions"). Accordingly, the related inventions will now be discussed for providing information about this combined use.

Figure 7:
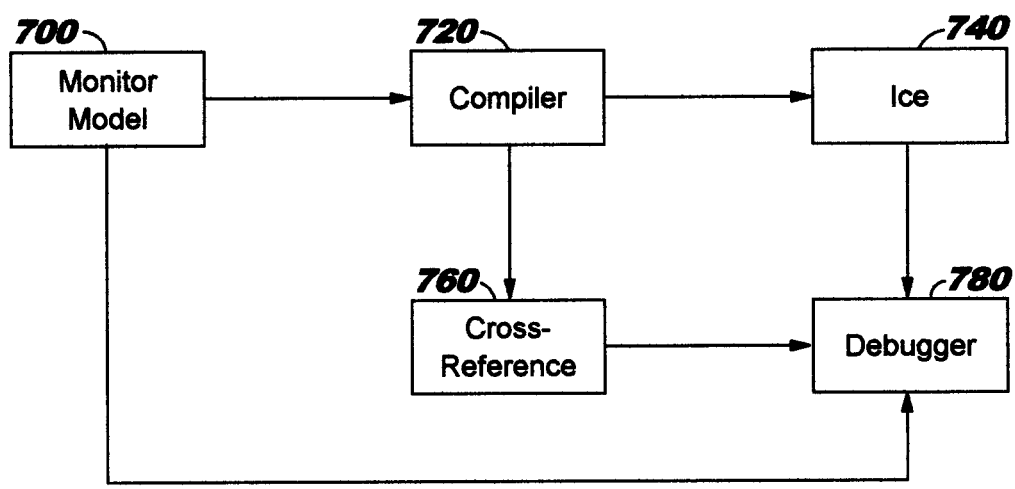
FIG. 7 illustrates a high-level view of processing that may be carried out by aspects of the present invention and inventions disclosed in the first and second related applications.

Referring now to FIG. 7, a high-level view of processing that may be carried out by aspects of the present and related inventions is illustrated. As shown therein, a monitor model 700 (as an example of a higher-level programming model as described herein) is provided as input to a compiler 720. Preferably, this compiler 720 generates code according to one aspect of the related inventions, where that generated code comprises instructions in the programming language disclosed herein according to an aspect of the present invention. This generated code is illustrated in FIG. 7 as an "Ice" file 740. For debugging purposes, compiler 720 also preferably generates a cross-reference file 760 that associates statements in Ice file 740 with source statements in the monitor model 700. Besides the monitor model 700, the Ice file 740 and cross-reference file 760 are used as input to a debugger 780 according to one aspect of the related inventions. (The terms "compiled output" and "generated output" are used interchangeably herein when referring to the executable file 740 created by the compiler 720.) As one alternative, Ice file 740 may be executed on a virtual machine as disclosed herein, without providing debugging thereof; cross-reference file 760 is not strictly needed in this alternative execution scenario.

XML notation is preferably used to specify the monitor model 700, the Ice file 740, and the cross-reference file 760. Although not shown in FIG. 7, an XML Schema for the monitor model 700 may be provided as an additional input to compiler 720, thereby enabling the compiler 720 of one aspect of the related inventions to validate the syntactic structure of the monitor model 700 (i.e., the input) during the compilation process. Furthermore, the compiler 720 may also use an XML Schema for the Ice file 740 and another schema for cross-reference file 760, where these schemas (also not shown in FIG. 7) specify allowable syntax and structure for the Ice document 740 and cross-reference file 760 and thus can be used to provide a certain level of structural validation of the compiler output.

FIGS. 3-5 of the first related application provide examples of a monitor model, compiler output file, and cross-reference file, respectively, to describe how Ice programs may be used in a monitor model programming environment (and in these examples, the monitor model corresponds to a simple cost aggregator scenario). The compiler output file shown in FIG. 4 of the first related application, which results from compiling the monitor model shown in FIG. 3 of the first related application, uses the programming language defined herein and may be executed on a virtual machine as disclosed herein. The discussion of these figures from the first related application is repeated herein, where the figures are presented as FIGS. 14-16. As stated earlier, however, the virtual machine disclosed herein is usable for executables compiled from more than one type of higher-level language programming model. Accordingly, in addition to supporting the executable shown in FIG. 4 of the first related application (repeated herein as FIG. 15), this virtual machine may support executables compiled from additional or different programming models. A sample executable for one such alternative programming model will now be described with reference to FIGS. 8-13 of the present application. FIGS. 8-13 provide examples of a state machine model, event type specification, event, context object type specification, context object, and Ice program for the state machine execution, respectively. The Ice program 1300 in FIG. 13 may be produced by a compiler from the model in FIG. 8. More specifically, the state machine model and event type specification comprise compiler input, and the context object specification and Ice program comprise compiler output. (Alternatively, the Ice implementation of the state machine could be defined manually, although using compilers to produce Ice executables is expected to be a more typical scenario.)

Figure 8:
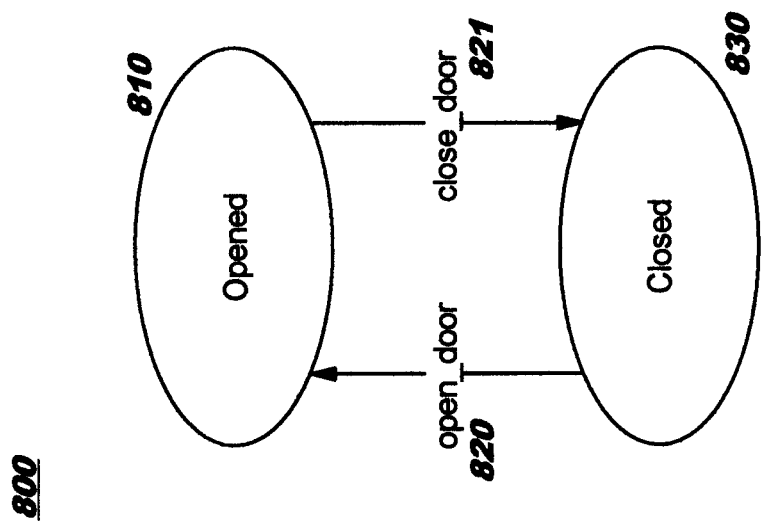

Referring first to FIG. 8, a finite state machine for a door is defined by the sample model 800. This door has two states, Opened (see 810) and Closed (see 830). An open_door event (see 820) causes a transition from the Closed state to the Opened state. A close_door event (see 821) causes a transition from the Opened state to the Closed state.

The event type specifications shown in schema 900 of FIG. 9 describe the type (i.e., structure) of open$_{13}$ door and close $_{13}$ door events. Both events have the same type, in this example, namely "tns:DoorEvent"; see 920. (Upon expanding the namespace definition for "tns", the type is {http://www.example.org/surveillance}DoorEvent; see 910, where the "tns" namespace is defined.) The DoorEvent type definition (see 930) defines two attributes for the payload of events adhering to this type, namely an "id" attribute 931 and a "time" (i.e., timestamp) attribute 932. The value of the id attribute identifies the door that is being opened or closed, and the value of the timestamp attribute indicates when this event happened.

The sample open_door event 1000 illustrated in FIG. 10 indicates that a door with identifier "Door001" (see 1010) was opened at 2008-01-01T09:33:41+05:00 (see 1020).

FIG. 11 shows a sample type definition 1100 for a context object representing the state machine 800 of FIG. 8 in an Ice execution environment. While this particular example has been manually created, it might alternatively be generated by a compiler from the state machine definition 800 of FIG. 8 and the event type definition illustrated at 900 of FIG. 9. The sample schema 1100 for the context object type includes, in this example, the schema 5900 for the door event types using an <xs:include>statement 1110. See the "schemaLocation" attribute 1111, which specifies as its value the doorEvent schema definition at location "doorEvent.xsd". The schema 1100 then defines the root element of the context object (see 1120, where the root element is specified as having the name "stateMachine"), whose type is given as a complex type definition. See 1122, where this complex type definition is referenced, and 1130, where it is defined. In this example, the type definition 1130 specifies that each context object of this type has the following structure:

an "_ice_key" element 1131, which will hold a generated, unique identifier for the object;

an "id" element 1132, which will hold the identifier of the door whose state is being mirrored by this context object;

a "state" element 1133, which holds the state machine's current state;

a "lastEvent" element 1134, which holds the timestamp of the last event processed by this context object; and a "tns:open$_{13}$ door" slot 1135 and "tns:close$_{13}$ door" slot 1136, which will hold copies of the last event of the corresponding type that the state machine has processed.

An enumeration type 1140 for the possible states of the state machine model (namely states "Opened" 1141 and "Closed" 1142, in this example) is also specified.

Referring now to FIG. 12, the sample context object 1200 illustrated therein is an instance of the stateMachine element defined in FIG. 11. In this example, the generated key (used as a unique identifier) of this object is shown at 1210. This sample context object 1200 processes events from a door with identifier "Door001" (see 1220), which has a current state of Opened (see 1230), and the last event for this context object was processed at the timestamp shown at 1240. Copies of the last open_door and close_door events that were processed are shown in the slots 1250 and 1260, respectively.

FIG. 13 shows an Ice program 1300 implementing the state machine 800 of FIG. 8, which processes events of the type defined at 900 of FIG. 9 and which operates upon context objects of the type defined in FIG. 11. Processing according to this sample Ice program 1300 will now be described.

When an event with root element "{http://www.example.org/surveillance}open_door" (or equivalently, "tns:open_door") arrives, and has a non-empty "id" attribute (i.e., the value "fn:exists(./@id)" of the filter attribute 1314 is true), the filter criteria of the <ice:on Event> statement 1310 are fulfilled. See 1312 of FIG. 13, where the required rootElement value 1313 and the filter 1314 are specified. Hence, all subordinate statements in the onevent element 1310 will be executed. (Note that the context item expression '.' is used to refer to the root of the current event. Accordingly, the syntax "fn:exists(./@id)" tests whether the "id" attribute is present at the root level of the current event. By contrast, relative path expressions that do not start with '.' navigate from the context object root, according to preferred embodiments.)

The first nested statement is <ice:fanOut> 1320. This fanOut statement 1320 identifies the root element of the target context object in the virtual machine's container (i.e., {http://www.example.org/surveillance}stateMachine; see 1323) and specifies a correlation predicate 1324. The correlation predicate 1324 compares the door identifier of the inbound event (as indicated by the syntax "./@id" at the left-hand side of the correlationPredicate attribute) with the id of a context object (i.e., "{http://www.example.org/surveillance}id" or equivalently, "tns:id", as specified on the right-hand side of the correlationPredicate attribute). The no/one/multiple matches attributes 1325-1327 indicate the action to be taken when zero/one/many context objects matching the correlation predicate are found, as discussed above with reference to FIG. 5.

When no existing context object matched the correlation predicate, a new context object is created and becomes the execution context for the subsequent steps, according to the "createNewTarget" value of the "noMatches" attribute at 1325. Since the newly created context object has not been initialized (and thus does not have a key), the branch specified at 1330 is not taken. Instead, the following statement 1340 is executed, which assigns a key to the new context object. Assignment 1350 then executes and sets the context object's "tns:id" or "{http://www.example.org/surveillance}id" value. In this example, the id value is set to the id attribute value from the incoming event (as indicated by the expression "./@id" on the value attribute of the assign statement 1350). Assignment 1360 executes next and copies the incoming $open_{13}$ door event to the {http://www.example.org/surveillance}open_door slot in the context object. Assignment 1370 then sets the {http://www.example.org/surveillance}lastEvent value in the context object, which holds a timestamp (see 1240 of FIGS. 12), to the value of the event timestamp on this currently-processed $open_{13}$ door event. Finally, assignment 1380 sets the context object's current state to Opened.

If a context object for the door in question did exist, the correlation predicate at 1324 evaluates to true for this object, which will become the execution context for all subsequent statements in the onevent specification 1310 for processing this open_door event, according to the "deliverToTarget" value of the "oneMatch" attribute at 1326. The branch condition at 1330 evaluates to true in this scenario, and the branch is therefore taken, causing the assignments 1340 and 1350 to be skipped. Statements 1360-1380 are executed as just described.

When an event with root element {http://www.example.org/surveillance}close_door (or equivalently, "tns: close_door") arrives, and has a non-empty "id" attribute (i.e., the value "fn:exists(./@id)" of the filter attribute 1393 is true), the filter criteria of the (second) <ice:on Event> statement 1390 are fulfilled. See 1391 of FIG. 13, where the required rootElement value 1392 and the filter 1393 are specified. The nested statements of that <ice:on Event> block are analogous to those just described for block 1310. The last assignment 1394 sets the state machine's state to Closed.

Note that a more sophisticated implementation of the state machine 800 in FIG. 8 would test the initial state before making a transition (that is, only process open_door events when the current state is Closed, for example). These tests have been omitted in the Ice program 1300, for simplicity.

Several statements that might be generated by the compiler are not illustrated in the example of FIG. 13. As discussed earlier with regard to the instructions of the programming language defined herein, these instructions include an <emit> statement, which is used to specify that an outbound event is to be emitted, and a <terminate> instruction, which is used to specify that the current context object should be terminated. Additional and/or different instructions may be supported by an implementation of the present invention without deviating from the scope of the present invention.

In addition to or instead of executing an Ice program compiled from the state machine model 800 of FIG. 8, the virtual machine disclosed herein might also be used for executing programs compiled from other higher-level programming models, as stated earlier. FIGS. 3-5 of the first related application provided examples of a monitor model, compiler output file, and cross-reference file, respectively. Those figures are repeated for the present application as FIGS. 14-16, and will now be discussed to describe how Ice programs may be used to execute a monitor model on a virtual machine as disclosed herein.

Referring first to FIG. 14, the syntax used therein will now be described to provide an understanding of this sample monitor model 1400. An <inboundEvent> element defines an event entry point for an instantiated model, and specifies details of the inbound events to be received at this entry point. A nested <filter> element may be used to specify particular criteria which must be met by an incoming event, and events not matching this specification are ignored. A nested <correlationPredicate> element may be used to associate each inbound event that passes the filtering criteria with the appropriate monitoring context(s) in which the event is to be processed. Attributes may be specified pertaining to the correlation predicate, indicating (for example) what action to take if there are no matches, what action to take if there is exactly one match, and what action to take if there are multiple matches.

An <outboundEvent> element defines an event exit point, whereby a specific event is to be emitted. A nested <filter> element may be used to filter out events whose emission should be suppressed.

One or more key values may be used with a monitoring context to enable more than one instance of the context to be instantiated from a particular monitoring context definition. The key values enable distinguishing among the multiple instantiations.

A <metric> element specifies a typed slot for a data value existing in a monitoring context. It may also specify processing instructions for how this value is initialized and updated. (A metric, in a monitor model context, refers to a data value.) Metric update instructions may be specified using maps which model data updates. (A "map", in a monitor model context, is a relationship defined between one or more input elements and one or more output elements.) The metric may be referenced in other element definitions, indicating the use of its value in evaluating a condition or updating other metrics at run time.

A <counter> element defines a counter to be used in a monitoring context. The counter may be incremented, decremented, set to zero, and referenced in other element definitions.

A <trigger> element serves as an initiator of one or more actions that should occur when particular criteria are met. When these criteria are met within a monitoring context, the trigger is said to "fire". This may impact other triggers, maps, or other entities in the model. In general, the effects of a trigger in a monitoring context can be the same or similar to those of an incoming event. It can thus be considered an "internal event" which is used to signal certain conditions discovered by the monitoring application.

A <stopwatch> element defines a value used in a monitoring context to represent elapsed time. The stopwatch may be started, stopped, reset, and referenced in other element definitions.

A <map> element may be a child of a <metric> or <outboundEvent> element, and defines a map that has one or more input slots and one or more output slots. Each input slot corresponds to a metric or to another type of entity that carries a data value. The output slot of a map also connects to a metric or to another type of entity that can receive one or more data values. The map specifies some algorithm that uses the values in the input slots to compute the output value(s), and writes the output value(s) to the output slot(s). A <map> element may contain <trigger> elements that specify when the map is executed and <assignment> elements that specify how to set a value of an output slot. The monitoring application may ensure that if an input slot of a map changes for any reason, the map is recomputed and the output slot is updated. (The compiler algorithm for generating such cascading updates uses recursion, according to preferred embodiments, as discussed in more detail below with reference to FIG. 18.)

Inbound events cause action(s) to be carried out at the monitoring application. Triggers internal to the model may also spontaneously invoke an action. For example, a <stopwatch> element may be compared with a time limit in a trigger condition that is evaluated periodically; when the time limit is exceeded, the trigger may fire and invoke an action, independently of any external events. Outbound events are populated with values, responsive to actions of the model, and emitted to the event bus (assuming any filtering criteria are met).

Additional and/or different elements and attributes may be supported by an implementation without deviating from the scope of the related inventions.

Returning now to the sample cost aggregator of FIGS. 14-16, a cost aggregator, in this example, is a monitor that listens to item cost events or messages. These events carry an order number, an item number, and a cost figure for this item. (See also FIG. 17, which provides a sample schema 1700 that may be used to describe the data structure of a cost aggregator instance.) The events processed by the cost aggregator may report, for example, the usage of an item in filling an order. When the first item cost event with a given order number arrives, a new cost aggregator instance is created and initialized with this order number. The shipping cost for this cost aggregator is set to a default value of $29.75 and its item cost, which will aggregate the cost figures of individual items, is initialized with 0. The item cost reported in the inbound event is then added to the item cost, and a total cost is calculated as the sum of item cost and shipping cost. Subsequent events for the same order will be delivered to the same aggregator, and the initialization phase will be skipped for these subsequent events: only the item cost and total cost values will be updated.

Sample monitor model 1400 of FIG. 14 specifies a single kind of inbound event as being of interest to this cost aggregator. See the <inboundEvent> specification at reference number 1410. As specified therein, the identifier ("id") for this event is "costReport". The correlator syntax 1412 for this event specifies that if after evaluating the correlation predicate for all existing instances, no matching monitoring context is found for an inbound event having the specified rootElement and extensionName, a new context is to be created, but if a single monitoring context matches this event, then the event is to be delivered to that matching monitoring context; on the other hand, if multiple monitoring contexts match this event, then this is an error and an exception is to be raised. The correlationPredicate expression at 1414 specifies how to determine whether a monitoring context matches this event, and in this example, the "orderNumber" value from the inbound event is compared to the "orderNum" metric of the currently-active monitoring contexts.

Each instance of this sample cost aggregator has 4 metrics, which are defined at 1420, 1430, 1440, 1450. A first metric 1420 is "OrderNum". Metric definition 1420 specifies that an "orderNumber" value from the extended data section of the "costReport" inbound event 1410 is used to set this OrderNum metric. Metric definition 1430 pertains to a "shippingCost" metric, and in this example, the metric definition specifies that a default value of $29.75 is assigned to the shippingCost metric at initialization time. Metric definition 1440 specifies processing for a "totalCost" metric of the cost aggregator, using a map that specifies conditional logic. As stated therein, if an "itemCost" value exists in the current monitoring context, then this value is added to the shipping cost (i.e., the shippingCost metric) and used to set the totalCost slot or metric in the monitoring context; otherwise, the shipping cost alone is used to set the totalCost metric. Finally, metric definition 1450 pertains to the "itemCost" metric. This definition 1450 provides a map and a default value specification. The map specifies that the itemCost metric is incremented by a "cost" value from the extended data section of the inbound "costReport" event, and the result is used as an output value for the itemCost slot in the monitoring context. The default value specifies that the itemCost is set to "0.0" at initialization time.

The compiler output file 1500 of FIG. 15 is generated, according to one aspect of the related inventions, as a sequentially-ordered executable corresponding to the declarative monitor model 1400 of FIG. 14. A single <onEvent> element 1510 (which uses a namespace prefix of "ice", and is therefore shown in FIG. 15 as <ice:on Event>) is generated in this example, and corresponds to the single inbound event entry point 1410 of FIG. 14. In the general case, an <onEvent> element specifies an inbound event subscription, and may comprise a "filter" attribute and/or a <fanOut> child element. The "filter" attribute captures the filtering criteria (if any) specified for this inbound event in the monitor model. The filter attribute generated for the example model in FIG. 14 will test that the root element of the inbound event is "cbe:CommonBaseEvent", and that it has an attribute "extensionName" whose value is "ReportItemCost". These conditions correspond to the rootElement and extensionName specifications in the <inboundEvent> element 1410. A <fanOut> element 1511 provides event correlation, encapsulating (in this example) syntax at 1512 that corresponds to the correlator syntax at 1412 and 1414 of FIG. 14, as well as elements 1520-1590 for all steps pertaining to processing the inbound event for <onEvent> element 1510. A <fanOut> element enables a context switch from the current context object (or from no context object at the beginning of processing an event) to one or more target context objects. The correlator syntax at 1512 indicates what action is taken for various matches upon evaluating the correlation predicate for all active context objects. Syntax at 1514 corresponds to the correlation predicate at 1414 of FIG. 14, and indicates that the "orderNumber" value from the inbound event is compared to the "orderNum" slot of the current context object to determine whether there is a match (or matches). In this example, the compiler has also translated the simplified syntax "costReport/extendedData/orderNumber" of the event field reference in 1414 into the actual XPath required to access this field in 1514.

A <branch> statement is generated at 1520, and tests whether a key value exists already for the matching context object. If so, then the context object is already created and initialized, and the branch statement indicates that control should jump ahead 5 steps (distance="5") at run time. Generating the branch statement to jump ahead 5 steps enables avoiding execution of the initialization steps which are generated at 1530-1560. Otherwise, if the key value does not yet exist, then the branch is not taken at run time and the next-sequential step 1530 is executed. In the general case, a <branch> statement provides a conditional transfer of control to a prior or succeeding step in the program (and a negative value may be used for the distance attribute to transfer control to a prior step).

Several <assign> statements are generated, comprising the syntax at 1530-1590, and will be referred to equivalently herein as "assignment" statements. In the general case, an <assign> statement specifies an assignment to a slot of the current monitoring context or an outbound event. Assignment statement 1530 initializes a key value for the current monitoring context instance, and assignment statement 1540 initializes the shippingCost metric in this instance to "29.75". Assignment statement 1550 initializes the itemCost metric of this instance to "0.0", and assignment statement 1560 carries out the same conditional processing discussed above with reference to syntax specified in the map for metric definition 1440 in the monitor model. This completes the sequence of initialization steps, which will be skipped if branch 1520 is taken. Assignment statement 1570 sets the orderNum metric to the value of the orderNumber from the incoming event, and corresponds to the map in metric definition 1420 in the monitor model. Assignment statement 1580 computes a value for the itemCost metric, as discussed above for the map in metric definition 1450, and assignment statement 1590 sets the totalCost metric as discussed above for the map in metric definition 1440.

Note that assignment statement 1590 is identical to assignment statement 1560, in this example. This occurs because the map for the totalCost metric depends on two inputs, namely itemCost and shippingCost. The compiler recognizes that those metrics are set during initialization, and thus generates code at 1560 to account for any downstream effects from these initializations. The compiler also recognizes that the itemCost metric is dynamically updated by executing the code at 1580, and therefore generates another assignment statement 1590 to account for that dynamic update. This illustrates how the compiler of an aspect of the related inventions translates the declarative logic of the monitor model into the proper sequence of assignment statements, after analyzing the data dependencies.

As can be seen by comparing compiler output file 1500 to the compiler input file, i.e., monitor model 1400, the ordering of statements within these related files is quite different, and a user stepping through compiler output file 1500 with a conventional debugger is likely to be confused in trying to determine what part of the source code is being executed at a point in time. (Furthermore, it may be even more difficult to determine an error source during normal execution if run-time errors are generated.) Accordingly, an aspect of the related inventions provides a cross-reference file as an additional compiler output and uses this file as an additional debugger input (as shown in FIG. 7 and discussed above). A sample version of this cross-reference file is shown at 1600 of FIG. 16, and will now be discussed.

File 1600 cross-references between the monitor model (compiler input) 1400 of FIG. 14 and the compiler output file 1500 of FIG. 15. These files 1400, 1500 are identified as the subject of the cross reference file at 1611 (using an mmResource attribute to identify the monitor model) and 1610 (using an iceResource attribute to identify the compiler output file). Note that relationships in this cross-reference file may be one-to-many, since a single element in a monitor model may give rise to multiple steps in the compiler output file.

An <mmStep> element is generated in file 1600 for each of the operations from the input monitor model (such as executing a map, stopping a stopwatch, incrementing a counter, and so forth). See, for example, <mmStep> element 1620. Each <mmStep> element identifies a model element from the source code and the corresponding statement(s) of the compiler output file. The model element defining the operation in the source code is identified, using a variation of the well-known XPath notation, as the value of an mmRef attribute within an <mmStep> element. So, for example, the mmRef attribute at 1630 identifies model element 1410 of file 1400, and the mmRef attribute at 1640 identifies the <map> element 1421 of file 1400. In this manner, the cross-reference file navigates through the elements of the monitor model 1400. The Ice statements in file 1500 are identified in the cross-reference file, using an XPath-like notation, as the value of an iceRefs attribute. For example, the iceRefs attribute at 1621 identifies statement 1510, 1511, 1520, 1530, 1540, 1550, and 1560 of the compiler output file 1500, all of which were generated to describe the effect of the <inboundEvent> 1410 referenced via the mmRef attribute 1630, and the iceRefs attribute at 1650 identifies the <assign> statement at 1590 (i.e., the seventh assignment statement generated within the nesting <fanOut>, identified in FIG. 16 using the ordinal value "6" for zero-based counting).

Note that the syntax identified with reference number 1622 comprises a single <mmStep> element. This is because the branch and assignment statements referenced therein all occur as a result of the inbound event subscription defined at 1410 of FIG. 14 (which definition continues through reference number 1419).

FIG. 18 illustrates a compiler algorithm used by an aspect of the related inventions for generating Ice language for a monitor model, as will now be discussed in more detail.

The compiler algorithm gets an inbound event definition (event subscription) from the model (Block 1800), and Block 1805 tests whether such definition was found. If so, an onevent statement (representing an event subscription, with its filter condition), a fanOut statement (representing the correlation logic), and context initialization statements are generated in Block 1810, resulting in logic similar to statements 1510-1560 in FIG. 15.

Next, preferred embodiments of this compiler find all downstream effects from the event that happen without intervening trigger control (e.g., all event-driven stopwatch and counter commands, in one embodiment, as well as all direct and indirect updates of metrics). All of these effects can be implemented using assignments of some calculated values to slots in an object representing the execution context (i.e., the monitoring context). Accordingly, Block 1815 generates an assignment (or assignments, as appropriate) for each of the event-driven stopwatch commands and each of the counter commands, and Block 1820 generates an assignment (or assignments, as appropriate) for each of the direct or indirect updates of metrics. Notably, these assignments are generated respecting dependencies. For example, if a map to metric1 depends on metric2, and both metrics are updated as a result of an incoming event, the assignments are generated to ensure that metric2 is updated before updating metric1. Since cyclic dependencies are forbidden in a monitor model, respecting data dependencies in determining the sequence of assignments will not lead to contradictions (or dead-locks) and generation of these cascading updates will end after a finite number of steps.

In Block 1825, code is generated that will fire any outbound events that are currently pending for emission. Next, Block 1830 generates code to evaluate any triggers pending for evaluation and fire them if needed. (As discussed earlier, triggers may become pending for evaluation as a result of metric updates, inbound events being received, other triggers firing, etc.)

Figure 18A:
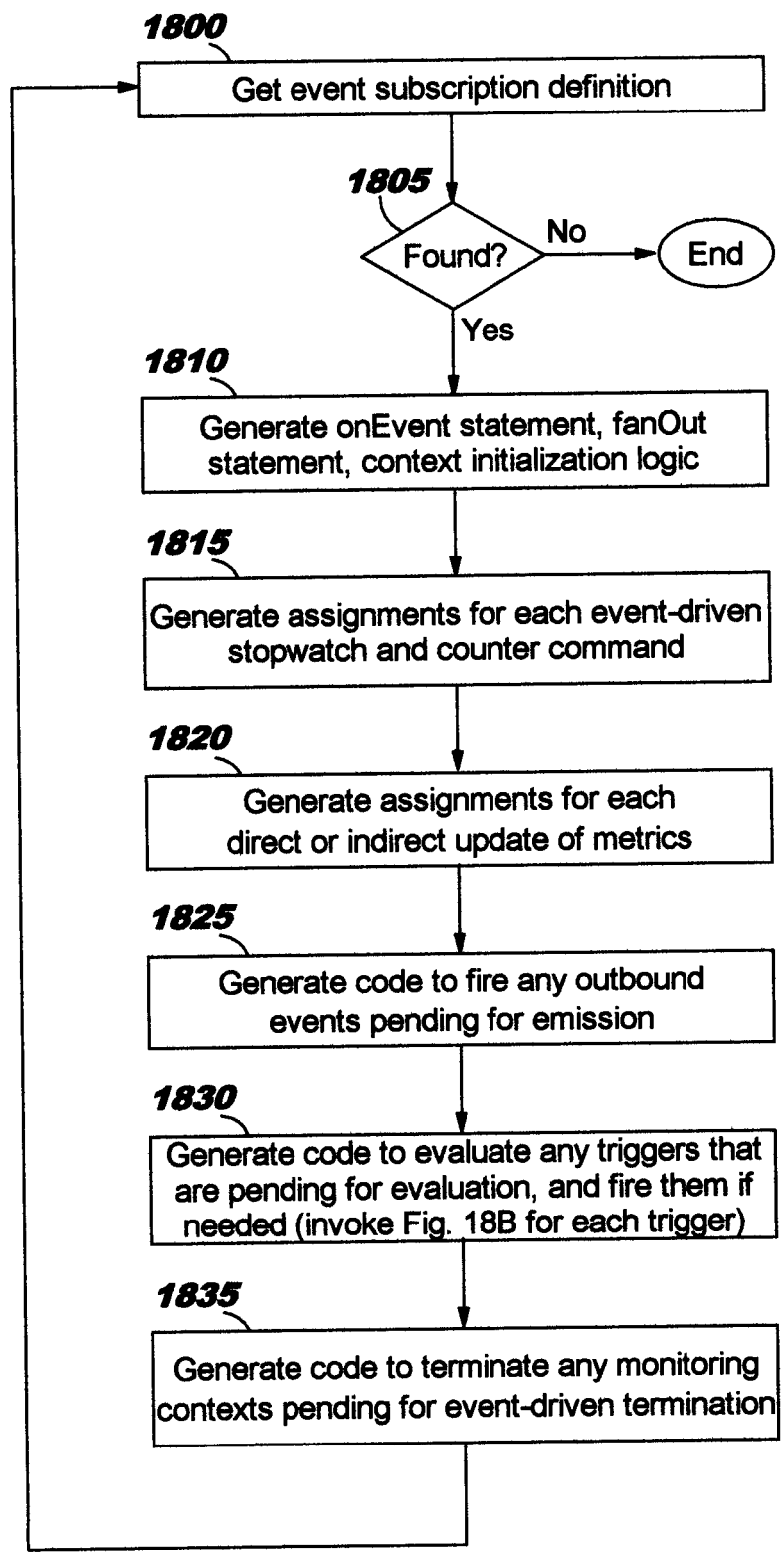
FIG. 18 (comprising FIGS. 18A and 18B) illustrates a compiler algorithm used by an aspect of the invention disclosed in the first related application.
Figure 18B:
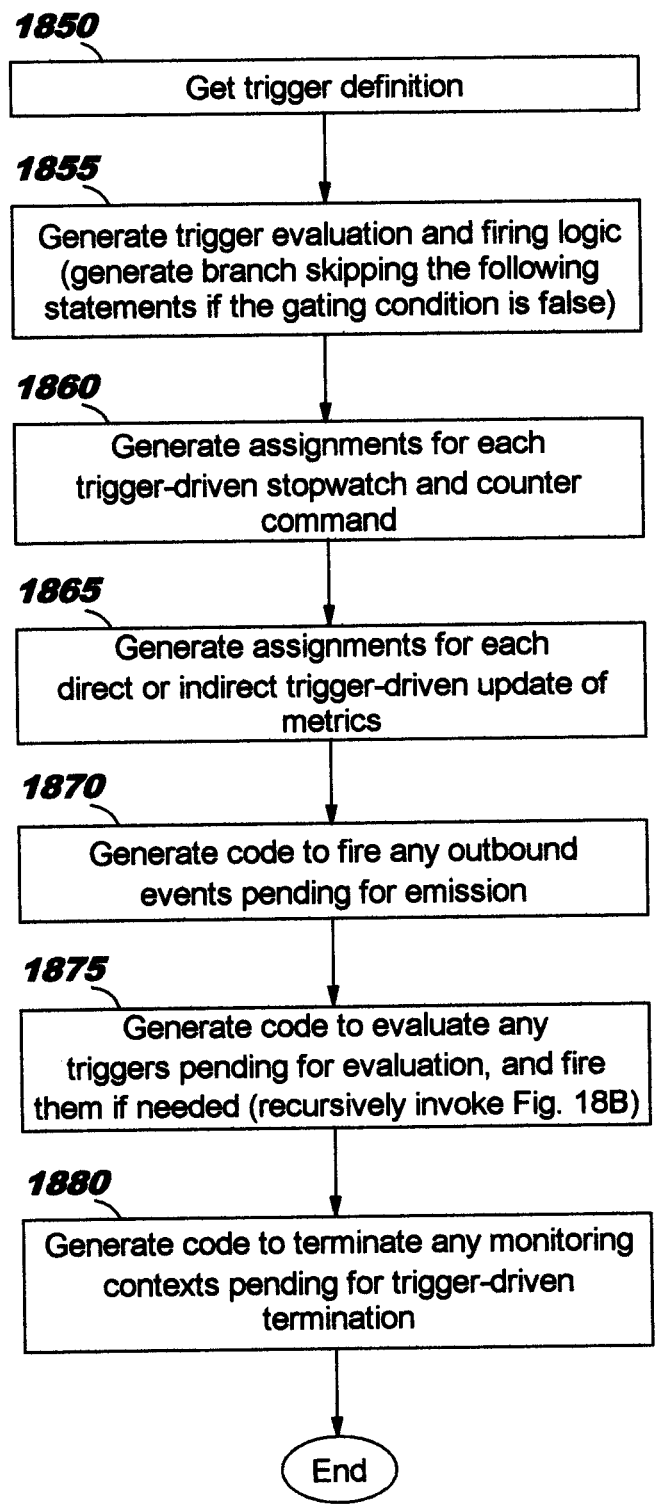

The processing at Block 1830 comprises, in preferred embodiments of the compiler, an invocation of the logic of FIG. 18B. Block 1835 then generates code that will terminate any monitoring contexts that are currently pending for termination. (An inbound event definition may contain syntax indicating that receipt of this kind of event represents a termination condition for the receiving monitoring context; any context receiving such an event would then become pending for termination.) Processing then returns from Block 1835 to Block 1800, where a next one of the event subscriptions is processed in an iterative manner until all inbound event definitions have been processed. Following a negative result for the test at Block 1805 (indicating that all of the inbound event definitions have now been processed), the processing in FIG. 18A ends.

FIG. 18B illustrates processing for triggers, similar to the inbound event processing of FIG. 18A. In Block 1850 of FIG. 18B, the compiler algorithm gets the definition of a to-be-evaluated trigger from the model. A branch statement, which tests the trigger's gating condition and skips the subsequent statements if it is false, is generated in Block 1855.

Preferred embodiments of the compiler then find all downstream effects of this trigger, including all trigger-driven stopwatch and counter commands (if such elements are present in the input model) as well as all direct and indirect updates of metrics that may occur as a result of this trigger firing. All of these effects can be implemented using assignments of some calculated values to slots in an object representing the execution context (i.e., the monitoring context). Accordingly, Block 1860 generates an assignment (or assignments, as appropriate) for each of the trigger-driven stopwatch commands and each of the counter commands, and Block 1865 generates an assignment (or assignments, as appropriate) for each of the direct or indirect updates of metrics. As discussed above with reference to Block 1820, the assignments generated at Block 1865 are generated respecting dependencies.

In Block 1870, code is generated that will fire any outbound events that are currently pending for emission. Block 1875 generates code to evaluate any triggers that have become pending for evaluation as a consequence of executing any of the statements generated previously, and fire them if needed, thereby causing the logic in FIG. 18B to be invoked recursively. (This recursion will end because there are only a finite number of trigger definitions and their dependency graph has no cycles.) Finally, Block 1880 generates code that will terminate any monitoring contexts that are currently pending for termination.

Note that the run-time order of processing triggers, if several fire at the same time, is undefined. This can be considered a race condition, and a similar race condition occurs if several inbound events are received at the same time. If the result of processing two simultaneously-arriving events according to a particular model depends on the order in which they are processed, then this model is an ill-defined model. Similarly, a model is ill-defined if the result of trigger processing for two simultaneously-firing triggers depends on the order in which their effects are executed. (It may be desirable to detect such issues in a monitor model editor and prompt the user to revise the model accordingly.) As a result, the apparent "arbitrariness" that may occur at Blocks 1830 and 1875 is natural, and in fact expected, for an event/trigger-driven programming model.

As can be seen by comparing FIGS. 18A and 18B, the generation of the statements representing the trigger's effects in FIG. 18B follows the same logic that is shown in FIG. 18A for inbound events: statements are generated for trigger-driven stopwatch and counter updates, direct and indirect updates of metrics, emission of outbound events, evaluation of further triggers (if such evaluation is caused by the preceding trigger or any updates it engendered), and finally for context termination if warranted.

As has been stated, the compiler—in addition to producing the execution sequence in the Ice output file—may also produce a cross-reference file that relates each step in the generated compiler output with an inbound event subscription, a map, a counter or stopwatch command, a trigger definition, or an outbound event definition from the original monitor model specification. These cross-references may be used by the debugger of the second related application, as the user executes steps in single-step mode, to highlight the original model constructs from which those steps of the generated compiler output were produced. Accordingly, at each of Blocks 1810-1835 and 1855-1880, the compiler preferably writes syntax into a cross-reference file to record relationships between the monitor model input file and the generated compiler output file. This syntax has been illustrated in FIG. 16, and discussed above with reference to this figure as well as FIGS. 14-15. (Note that various "housekeeping"-type syntax is generated by the compiler for the output file illustrated by FIG. 15 and the cross-reference file illustrated by FIG. 16, such as the namespace definition, or "xmlns", statements appearing at the beginning of those files. Such syntax is readily understood by those of ordinary skill in the art, and an explanation thereof is not deemed necessary to an understanding of the present or related inventions.)

FIG. 19 provides a sample schema 1900 for the Ice language, according to a preferred embodiment of an aspect of the present invention. (This sample schema is provided by way of illustration but not of limitation.)

As will be appreciated by one of skill in the art, embodiments of the present invention may be provided as (for example) methods, systems, and/or computer program products. The invention can take the form of an entirely hardware embodiment, an entirely software embodiment, or an embodiment containing both hardware and software elements. In a preferred embodiment, the invention is implemented in software, which includes (but is not limited to) firmware, resident software, microcode, etc. In a hardware embodiment, specialized or dedicated circuitry may be provided that carries out functions described herein. Furthermore, the present invention may take the form of a computer program product which is embodied on one or more computer-usable storage media (including, but not limited to, disk storage, CD-ROM, optical storage, and so forth) having computer-usable program code embodied therein, where this computer program product may be used by or in connection with a computer or any instruction execution system. For purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory ("RAM"), a read-only memory ("ROM"), a rigid magnetic disk, and an optical disk. Current examples of optical disks include compact disk read-only memory ("CD-ROM"), compact disk read/write ("CD-R/W"), and DVD.

Figure 20:
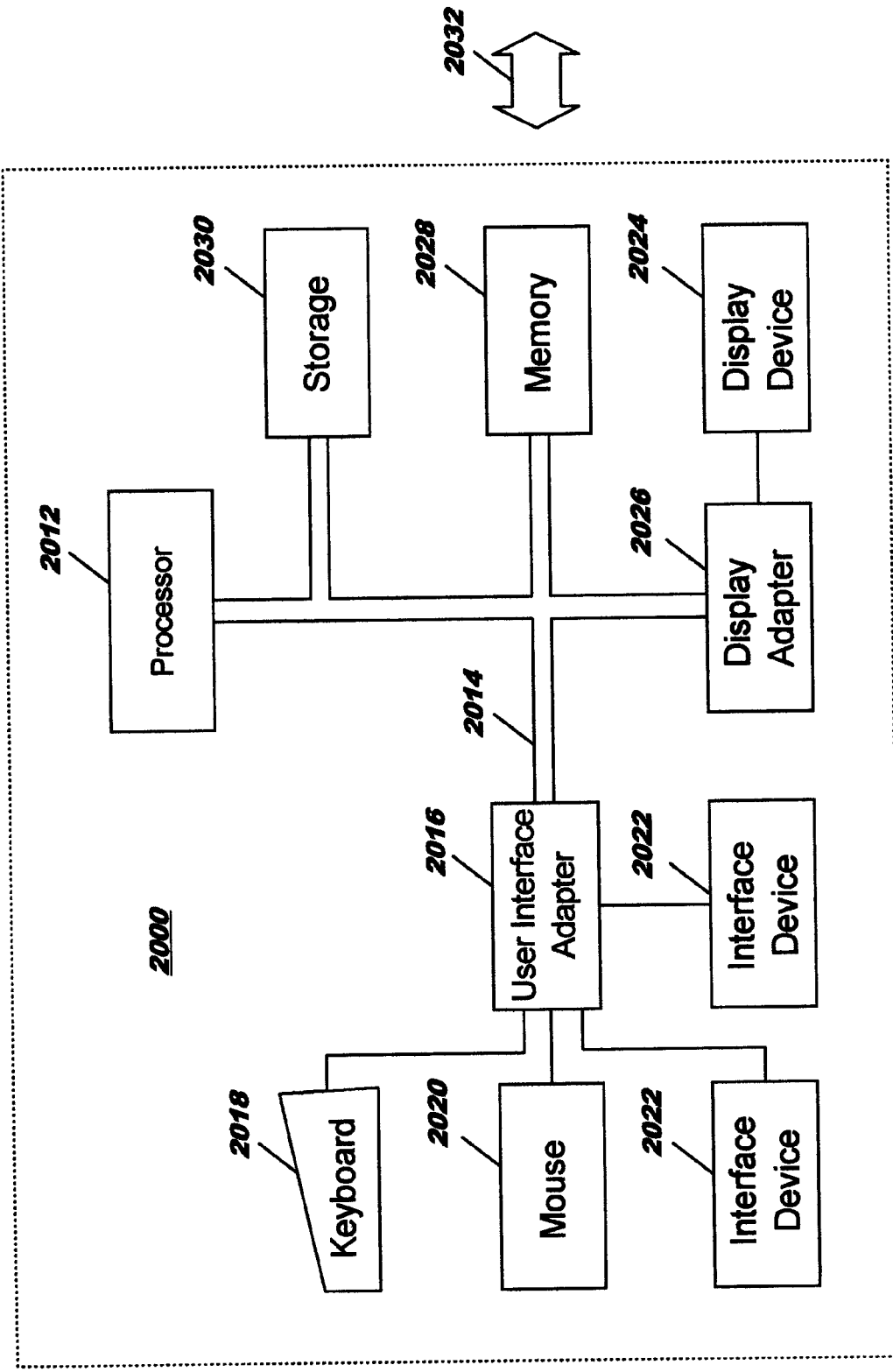
FIG. 20 depicts a data processing system suitable for storing and/or executing program code.

Referring now to FIG. 20, a data processing system 2000 suitable for storing and/or executing program code includes at least one processor 2012 coupled directly or indirectly to memory elements through a system bus 2014. The memory elements can include local memory 2028 employed during actual execution of the program code, bulk storage 2030, and cache memories (not shown) which provide temporary storage of at least some program code in order to reduce the number of times code must be retrieved from bulk storage during execution.

Input/output ("I/O") devices (including but not limited to keyboards 2018, displays 2024, pointing devices 2020, other interface devices 2022, etc.) can be coupled to the system either directly or through intervening I/O controllers or adapters (2016, 2026).

Network adapters may also be coupled to the system to enable the data processing system to become coupled to other data processing systems or remote printers or storage devices through intervening private or public networks (as shown generally at 2032). Modems, cable modem attachments, wireless adapters, and Ethernet cards are just a few of the currently-available types of network adapters.

Figure 21:
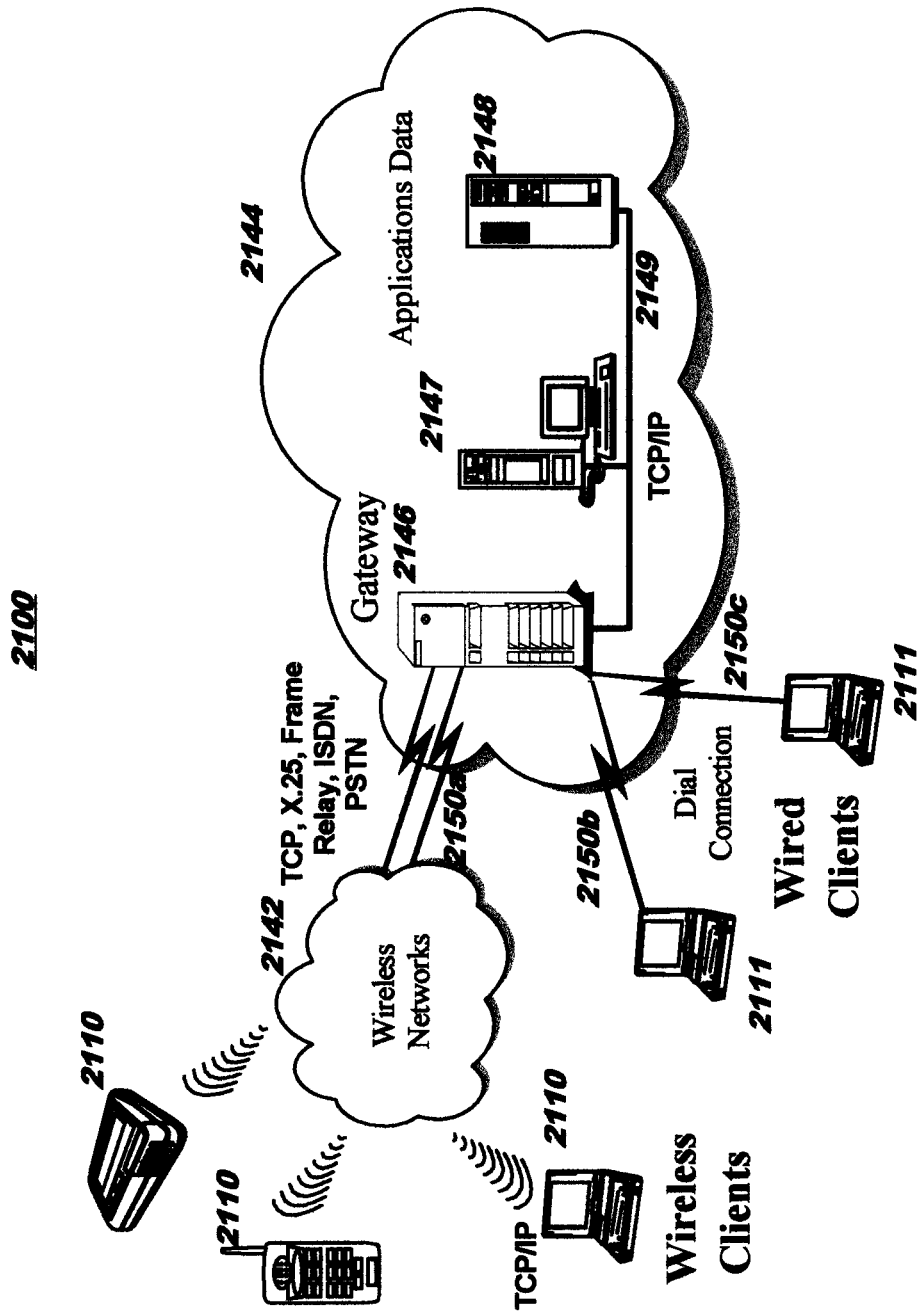
FIG. 21 depicts a representative networking environment in which one or more embodiments of the present invention may be used.

FIG. 21 illustrates a data processing network environment 2100 in which the present invention may be practiced. The data processing network 2100 may include a plurality of individual networks, such as wireless network 2142 and network 2144. A plurality of wireless devices 2110 may communicate over wireless network 2142, and a plurality of wired devices, shown in the figure (by way of illustration) as workstations 2111, may communicate over network 2144. Additionally, as those skilled in the art will appreciate, one or more local area networks ("LANs") may be included (not shown), where a LAN may comprise a plurality of devices coupled to a host processor.

Still referring to FIG. 21, the networks 2142 and 2144 may also include mainframe computers or servers, such as a gateway computer 2146 or application server 2147 (which may access a data repository 2148). A gateway computer 2146 serves as a point of entry into each network, such as network 2144. The gateway 2146 may be preferably coupled to another network 2142 by means of a communications link 2150a. The gateway 2146 may also be directly coupled to one or more workstations 2111 using a communications link 2150b, 2150c, and/or may be indirectly coupled to such devices. The gateway computer 2146 may be implemented utilizing an Enterprise Systems Architecture/390® computer available from IBM. Depending on the application, a midrange computer, such as an Application System/400® (also known as an AS/400®, iSeries®, System i™, and so forth may be employed. ("Enterprise Systems Architecture/390", "Application System/400", "AS/400", and "iSeries" are registered trademarks of IBM in the United States, other countries, or both, and "System i" is a trademark of IBM.)

The gateway computer 2146 may also be coupled 2149 to a storage device (such as data repository 2148).

Those skilled in the art will appreciate that the gateway computer 2146 may be located a great geographic distance from the network 2142, and similarly, the wireless devices 2110 and/or workstations 2111 may be located some distance from the networks 2142 and 2144, respectively. For example, the network 2142 may be located in California, while the gateway 2146 may be located in Texas, and one or more of the workstations 2111 may be located in Florida. The wireless devices 2110 may connect to the wireless network 2142 using a networking protocol such as the Transmission Control Protocol/Internet Protocol ("TCP/IP") over a number of alternative connection media, such as cellular phone, radio frequency networks, satellite networks, etc. The wireless network 2142 preferably connects to the gateway 2146 using a network connection 2150a such as TCP or User Datagram Protocol ("UDP") over IP, X.25, Frame Relay, Integrated Services Digital Network ("ISDN"), Public Switched Telephone Network ("PSTN"), etc. The workstations 2111 may connect directly to the gateway 2146 using dial connections 2150b or 2150c. Further, the wireless network 2142 and network 2144 may connect to one or more other networks (not shown), in an analogous manner to that depicted in FIG. 21.

The present invention has been described with reference to flow diagrams and/or block diagrams according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A virtual machine for executing a program, comprising:
an instruction executor for executing instructions from the program using a computer, wherein:
the instructions from the program have been generated in an intermediate language, by a compiler, to cause processing of an execution sequence according to a specification of a model, the model specification encoded using a model notation that is distinct from the intermediate notation;
the instructions from the program are encoded in a markup language notation by the compiler and are selected by the compiler from allowable instructions of the intermediate language, the markup language notation being distinct from the intermediate language; and
the allowable instructions of the intermediate language comprise: an event instruction for receiving an inbound event; an assignment instruction for assigning a value; a branch instruction for conditional transfer to a different one of the instructions; an emit instruction for specifying that an outbound event is to be emitted; a terminate instruction for specifying that a current execution context object is to be terminated; and a fan-out instruction for at least one of specifying event correlation and enabling a context switch, the context switch causing a particular execution context object to be used as the current execution context object.

2. The virtual machine according to claim 1, wherein the model specification is an event-driven model specification.

3. The virtual machine according to claim 1, wherein the model specification is a message-driven model specification.

4. The virtual machine according to claim 1, wherein the virtual machine is usable for executing a plurality of programs, the plurality of programs generated, by at least two different compilers, to cause processing of respective execution sequences according to at least two different specifications of execution models.

5. The virtual machine according to claim 1, wherein the executing of the event instruction further comprises:
   executing the event instruction to receive a particular inbound event according to the specification of the model;
   locating a fan-out instruction associated with the event instruction;
   executing the located fan-out instruction to determine, using correlation predicate information associated with the located fan-out instruction, zero or more execution context objects to use for processing the particular inbound event; and
   directing the particular inbound event to each determined execution context object, if any, for the processing of the particular inbound event therein.

6. The virtual machine according to claim 1, wherein the event instruction for receiving an inbound event specifies a filter that is to be evaluated by the virtual machine instruction executor, responsive to receiving a particular inbound event, to determine whether the event instruction is applicable for processing the particular inbound event.

7. The virtual machine according to claim 1, wherein the virtual machine instruction executor determines which of a plurality of event instructions from the program to execute, upon receiving a particular inbound event, by comparing a type declared by the particular inbound event to a type specification, when present, in each of the plurality of event instructions.

8. The virtual machine according to claim 1, wherein the executing of the assignment instruction further comprises:
   evaluating an expression of the assignment instruction; and
   assigning, as the value, a result of the evaluating to a target identified by the assignment instruction, the target comprising a slot of a current execution context object or of an outbound event that is to be emitted.

9. The virtual machine according to claim 1, wherein the executing of the branch instruction further comprises:
   evaluating a condition expression of the branch instruction; and
   wherein the conditional transfer further comprises next executing the different one of the instructions, as identified by an attribute of the branch instruction, when the evaluation returns a true result, and otherwise next executing a next sequential one of the instructions.

10. The virtual machine according to claim 1, wherein the executing of the emit instruction further comprises emitting, to an event bus, the outbound event.

11. The virtual machine according to claim 10, wherein the executing of the emit instruction further comprises evaluating an expression specified on the emit instruction and reflecting a result of the evaluating in the outbound event prior to the emitting.

12. The virtual machine according to claim 1, wherein the executing of the terminate instruction further comprises terminating the current execution context object.

13. The virtual machine according to claim 1, wherein the virtual machine instruction executor executes the instructions of the program by:
   detecting arrival of an inbound event;
   comparing the inbound event to each event instruction from the program to determine if the event instruction from the program is applicable for processing the inbound event; and
   for each event instruction from the program which is determined to be applicable for processing the inbound event, performing:
      obtaining subordinate instructions of the event instruction, the subordinate instructions comprising zero or more of: the assignment instruction, the branch instruction, the emit instruction, the fan-out instruction, and the terminate instruction; and
      executing each of the zero or more obtained subordinate instructions.

14. The virtual machine according to claim 13, wherein:
   executing the fan-out instruction of an applicable event instruction, responsive to detecting the arrival of the inbound event, causes selection of one or more particular existing context object as the current execution context object, or creation of a new execution context object and selection of the new execution context object as the current execution context object; and
   the selected current execution context object is used when executing each next-sequential one of the obtained subordinate instructions until encountering one of: the terminate instruction, and then terminating the current execution object when executing the terminate instruction; or another fan-out instruction, and then selecting a different execution context object as the current execution context object when executing the other fan-out instruction.

15. A computer program product for executing a virtual machine, wherein the computer program product is embodied on one or more non-transitory computer-readable storage media and comprises computer-readable instructions for:
   obtaining instructions from a program, the instructions from the program having been generated in an intermediate language, by a compiler, to cause processing of an execution sequence according to a specification of a model, the model specification encoded using a model notation that is distinct from the intermediate notation, and
   executing the obtained instructions from the program using the virtual machine on a computer, wherein the instructions from the program are encoded in a markup language notation by the compiler and are selected by the compiler from allowable instructions of the intermediate language, the markup language notation being distinct from the intermediate language, the allowable instructions of the intermediate language comprising: an event instruction for receiving an inbound event; an assignment instruction for assigning a value; a branch instruction for conditional transfer to a different one of the instructions; an emit instruction for specifying that an outbound event is to be emitted; a terminate instruction for specifying that a current execution context object is to be terminated; and a fan-out instruction for at least one of specifying event correlation and enabling a context switch, the context switch causing a particular execution context object to be used as the current execution context object.

16. A non-transitory computer-readable storage medium storing source code written in a programming language, wherein:
the programming language comprises an intermediate language which is generated, by a compiler, to cause processing of an execution sequence according to a specification of a model, the model specification encoded using a model notation that is distinct from the intermediate notation, and allowable instructions of the intermediate language comprising:
an event instruction for receiving an inbound event;
an assignment instruction for assigning a value;
a branch instruction for conditional transfer to a different one of the instructions;
an emit instruction for specifying that an outbound event is to be emitted;
a terminate instruction for specifying that a current execution context object is to be terminated; and
a fan-out instruction for at least one of specifying event correlation and enabling a context switch, the context switch causing a particular execution context object to be used as the current execution context object; and
the source code comprises a plurality of the allowable instructions of the programming language which are selected by the compiler, wherein the source code is encoded by the compiler, during the generating, in a markup language notation and is executable to cause processing of the execution sequence according to the specification of the model.

17. The computer-readable medium according to claim 16, wherein model specification is an event-driven model specification.

18. The computer-readable medium according to claim 16, wherein the model specification is a message-driven model specification.

19. A program of instructions stored on a non-transitory computer-readable storage medium which, when executed, causes a computer to perform:
obtaining the instructions from the program, the instructions from the program having been generated in an intermediate language, by a compiler, to cause processing of an execution sequence according to a specification of a model, the model specification encoded using a model notation that is distinct from the intermediate notation; and
executing the obtained instructions from the program, wherein the instructions from the program are encoded in a markup language notation by the compiler and are selected by the compiler from allowable instructions of the intermediate language, the markup language notation being distinct from the intermediate language, the allowable instructions of the intermediate language comprising:
an event instruction for receiving an inbound event;
an assignment instruction for assigning a value;
a branch instruction for conditional transfer to a different one of the instructions;
an emit instruction for specifying that an outbound event is to be emitted;
a terminate instruction for specifying that a current execution context object is to be terminated; and
a fan-out instruction for at least one of specifying event correlation and enabling a context switch, the context switch causing a particular execution context object to be used as the current execution context object.

20. The program of instructions according to claim 19, wherein the model specification is an event-driven model specification.

21. The program of instructions according to claim 19, wherein the model specification is a message-driven model specification.

* * * * *